US007472569B2

(12) United States Patent
Talpe

(10) Patent No.: US 7,472,569 B2
(45) Date of Patent: Jan. 6, 2009

(54) SELF-LATCHING DEVICE FOR FASTENING A HINGED CLOSURE MEMBER

(76) Inventor: Joseph Talpe, Oudenaardsesternweg 543, Avelgem-Kerkhove (BE) 8581

(*) Notice: Subject to any disclaimer, the term of this patent is extended or adjusted under 35 U.S.C. 154(b) by 347 days.

(21) Appl. No.: 11/271,813

(22) Filed: Nov. 14, 2005

(65) Prior Publication Data

US 2006/0103142 A1 May 18, 2006

(30) Foreign Application Priority Data

Nov. 15, 2004 (EP) ................................ 04105784

(51) Int. Cl.
*B60R 25/02* (2006.01)

(52) U.S. Cl. ........................................ 70/210; 292/164

(58) Field of Classification Search .................. 70/210; 292/164

See application file for complete search history.

(56) References Cited

U.S. PATENT DOCUMENTS

| | | | | |
|---|---|---|---|---|
| 1,570,603 | A | 1/1926 | Holda | |
| 5,052,461 | A | 10/1991 | Stern | |
| 5,367,829 | A * | 11/1994 | Crossley et al. | 49/465 |
| 5,829,505 | A * | 11/1998 | Brescia | 160/225 |
| 5,924,242 | A | 7/1999 | Macari et al. | |
| 6,425,609 | B2 * | 7/2002 | Cheng | 292/5 |
| 7,065,922 | B1 * | 6/2006 | De Kruijf et al. | 49/57 |
| 7,100,405 | B2 * | 9/2006 | West | 70/100 |
| 7,178,792 | B2 * | 2/2007 | Monahan et al. | 256/73 |
| 2003/0005643 | A1 | 1/2003 | Yang | |

* cited by examiner

*Primary Examiner*—Suzanne D Barrett
(74) *Attorney, Agent, or Firm*—Sughrue Mion, PLLC

(57) ABSTRACT

The self-latching device comprises a frame (11, 17, 21, 24, 31) arranged to be mounted on the hinged closure member, in particular on a gate, a latch bolt (7) movably mounted on the frame in a horizontal direction between a latching position and a retracted position, a latch bolt spring (70) arranged to bias the latch bolt (7) into the latching position, and operator means (10) mounted on top of the frame so as to be operable from both sides of the closure member (2) and connected by means of a latch bolt operating mechanism to the latch bolt (7) for moving it from the latching to the retracted position. The self-latching device is especially suited for being mounted in a vertical tubular member of or fixed to a safety gate around an area which is dangerous for children, in particular around a swimming pool area.

22 Claims, 17 Drawing Sheets

SELF-LATCHING DEVICE FOR FASTENING A HINGED CLOSURE MEMBER

BACKGROUND OF THE INVENTION

The present invention relates to a self-latching device for fastening a hinged closure member, in particular a door or a gate, which device comprises a frame arranged to be mounted on the hinged closure member, a latch bolt mounted on said frame so as to be movable in a predetermined direction between a latching position and a retracted position, the latch bolt being a self-latching bolt arranged to be moved towards its retracted position by contact with a striker element when closing the closure member, a latch bolt spring arranged to bias the latch bolt into the latching position, and operator means mounted on top of the frame so as to be operable from both sides of the closure member and connected by means of a latch bolt operating mechanism to the latch bolt for moving it from the latching to the retracted position.

The self-latching device can be mounted on various types of doors, gates, etc. However, the latching device according to the present invention is especially suited for being mounted in an upright position on top of a gate in a safety fence for preventing small children from entering a certain dangerous area, such as a swimming pool area.

In several countries there are legal regulations for swimming pool gates. Most of these regulations specify for example a minimum height for the safety gates. An important characteristic is also the vertical distance between two potential supports allowing children to climb over the gate, for example between the lowermost horizontal tubular member of a gate and the door handles when these protrude on the back and on the front of the gate. The distance between two potential supports must also be greater than a minimum distance. By mounting the latching device in an upright position on top of the gate with the operator means on the upper side of the latching device, the height of the gate may therefore be limited. According to some regulations, the operator means of the latching device must be situated at a height higher than the minimum height of the gate itself. Also in this case the height of the gate can be limited due to the fact that the latching device can be mounted on top of for example a tubular member projecting above the actual gate itself.

U.S. Pat. No. 3,282,617 discloses a self-latching device comprising a spring-biased latch bolt protruding out of the bottom of a vertical tubular member of the gate. This latch bolt co-operates with a striker plate fixed to a fence post below the latch bolt. On the upper end of the tubular member of the gate a cap is fitted so that it can be manually lifted axially of the tubular member. A cable extending through the tubular member connects the cap with the latch bolt to enable to withdraw the latch bolt out of the striker plate by lifting the cap. The cap is placed at such a height on the gate that it is out of the reach of small children.

A drawback of this known self-latching device is that the gate has to be of a quite rigid construction since it is fastened at its lower edge to the striker plate so that considerable torsion stresses may be generated in the gate when somebody pulls or pushes to the upper edge of the gate. A further drawback is that the striker plate forms a projection at a certain height on the fence post against which a person passing the gate may hurt himself by knocking with his legs or feed against the striker plate. Moreover, the cavity in the striker plate can easily become filled with dirt. An important drawback is further that the co-operation between the latch bolt and the striker plate requires a quite accurate positioning of both elements with respect to one another. Each time the gate sags somewhat the height of the striker plate has thus to be adjusted to ensure a reliable functioning of the self-latching device.

WO-A-92/03631 discloses a self-latching device for hinged swimming pool gates comprising also a bolt protruding out of the bottom of the latching device into a retaining element. This retaining element comprises a permanent magnet to draw the bolt into the retaining element against the bias of a compression spring. The latching device can be mounted on top of the gate so that the bolt is situated at a certain height on the gate and so that the torsion stresses in the gate are thus reduced. In practice, the latching devices disclosed in WO-A-92/03631 are mounted on the fence post so that the retaining element protrudes from the gate instead of from the fence post. A drawback of such an arrangement is however that a person who wants to open the gate has to have both hands free as he has to pull the bolt of the latching device with one of his hands upward and at the same time he has to open the gate with his other hand. A further drawback of this known latching device is that the retaining element has to be positioned perfectly underneath the bolt in order to be able to draw the bolt by magnetic attraction into the retaining element. Consequently, when the gate sags or otherwise moves somewhat, the distance between the permanent magnet and the bolt will become immediately so great that the magnetic force will no longer be able to attract the bolt against the tension of the compression spring and the gate will thus no longer be latched. A regular check up and adjustment of the mutual position of the retaining element and of the latching device will thus be necessary.

SUMMARY OF THE INVENTION

An object of the present invention is now to provide a new self-latching device of the above-defined type which enables to latch the closure member at a certain height on this closure member and which can easily be designed to enable a relatively large sagging of the closure member without requiring any adjustment of the latching device or of the striker element to assure a reliable functioning of the latching device.

To this end, the self-latching device according to the invention is characterised in that, when the latching device is mounted in an upright position on the closure member, the latch bolt is movable in a substantially horizontal direction between its latching and its retracted position.

Since the latch bolt is movable in a horizontal direction it can be provided at the desired height on the gate since it does not have to co-operate with a striker plate provided underneath the gate. Moreover, the striker plate can be provided with an elongated cavity so that, even when the gate sags, the latch bolt will still engage this cavity.

A device for fastening a gate which comprises a bolt movable in a horizontal direction and operator means mounted on top of the frame of the device so as to be movable from both sides of the gate is already known per se from U.S. Pat. No. 1,570,603. An essential difference with the device according to the invention is however that it is not a self-latching device, i.e. it comprises a dead bolt instead of a latch bolt. The dead bolt can be locked in its extended and in its retracted position. A drawback of this know fastening device is that the gate cannot simply be closed without having to operate the fastening device and that for unlocking the fastening device, one has to use even both his hands.

Other fastening devices are disclosed in U.S. Pat. Nos. 5,924,242 and 5,052,461. These fastening devices are mounted on a removable safety gate which is arranged to be clamped between two supports, for example between two walls. The fastening devices do not comprise bolts but instead plungers which are urged by means of quite strong springs against the support. Due to the shape of the plungers, and especially also due to the strong springs urging them to their extended positions, these plungers are essentially different from latch bolts which are arranged to be pushed in automatically by contact with a striker element when closing the closure member.

In a preferred embodiment of the latching device according to the invention, the latch bolt is mounted in such a manner on the frame that it can be moved against the biasing force of the latch bolt spring to its retracted position whilst the latch bolt operating mechanism remains in its rest position, i.e. in the position it takes in when the latch bolt is in its latching position.

When closing the closure member only the latch bolt has to be pushed in, and this only against the biasing force of the latch bolt spring, so that a lightly closing closure member can be achieved. The latch bolt spring has preferably such a spring constant that a force smaller than 30 N, preferably smaller than 20 N, has to be exerted onto the latch bolt to bring it in its retracted position. To assure a reliable return of the operator knob to its rest position, the latch bolt operating mechanism preferably comprises a further spring for urging the latch bolt operating mechanism, independently from the latch bolt, to its rest position. This further spring does not increase the force which has to be exerted onto the latch bolt to bring it into its retracted position.

In a further preferred embodiment of the latching device according to the invention, the latch bolt operating mechanism comprises an operator shaft which is pivotally mounted around its longitudinal axis on said frame and which has an upper and a lower end, the operator means being connected to the upper end of the operator shaft to enable to rotate the operator shaft by means of the operator means, and at least one cam element provided on the lower end of the operator shaft and arranged to move the latch bolt against the biasing force of the latch bolt spring to its retracted position upon rotation of the operator shaft in at least one rotational direction.

An advantage of this embodiment is that the latch bolt can be retracted by a simple rotation of the operator means. Moreover, a further cam element can be provided on the lower end of the operator shaft which is also arranged to move the latch bolt against the biasing force of the latch bolt spring to its retracted position upon rotation of the operator shaft in a rotational direction which is however opposite the direction wherein the operator shaft has to be rotated to displace the follower element with the other cam element. In this way, the latch bolt can be withdrawn by rotating the operator means in either one direction so that the latching device can be used both for a left and for a right swinging gate.

In another preferred embodiment of the latching device according to the invention the latch bolt operating mechanism comprises a follower element which is movably mounted on the frame according to a direction having at least a component coinciding with the predetermined direction wherein the latch bolt moves, the latch bolt being biased by the latch bolt spring against the follower element and the follower element being hingedly connected to the frame about a hinge axis which is located at a predetermined distance from the location where the latch bolt is biased by the latch bolt spring against the follower element, a force exerted onto the operator means to unlock the latching device being transmitted to the follower element at a location on the follower element situated at a distance smaller than said predetermined distance from the hinge axis of the follower element to move the follower element in said direction against the biasing force of the latch bolt spring. In this way, a quite large stroke of the latch bolt can be achieved by a relatively small displacement of the operator means, in particular even when the cam element is for example situated at a relatively small distance from the rotation axis of the operator shaft so that a compact construction can be obtained. Such a compact construction is important if the latching device is to be arranged for example in a vertical tubular member of the gate.

In still another preferred embodiment, the latching device further comprises a striker element, a hinged latch having a first end, which is arranged to be caught in the closed position of the closure member behind said striker element, and a second end, which is arranged to be hingedly connected around a hinge axis to the closure member, and means for connecting the distal end of the latch bolt to the hinged latch, between the first and the second end thereof.

In this embodiment, the stroke of the end of latch which co-operates with the striker element is larger than the stroke of the latch bolt so that also in this embodiment the latch bolt operating mechanism can be kept more compact, in particular in such a manner that the latch device can be mounted in a tubular member.

BRIEF DESCRIPTION OF THE DRAWINGS

Other particularities and advantages of the invention will become apparent from the following description of some particular embodiments of the self-latching device according to the present invention. The reference numerals used in this description relate to the annexed drawings wherein.

DETAILED DESCRIPTION OF THE PREFERRED EMBODIMENTS

Figure 1:
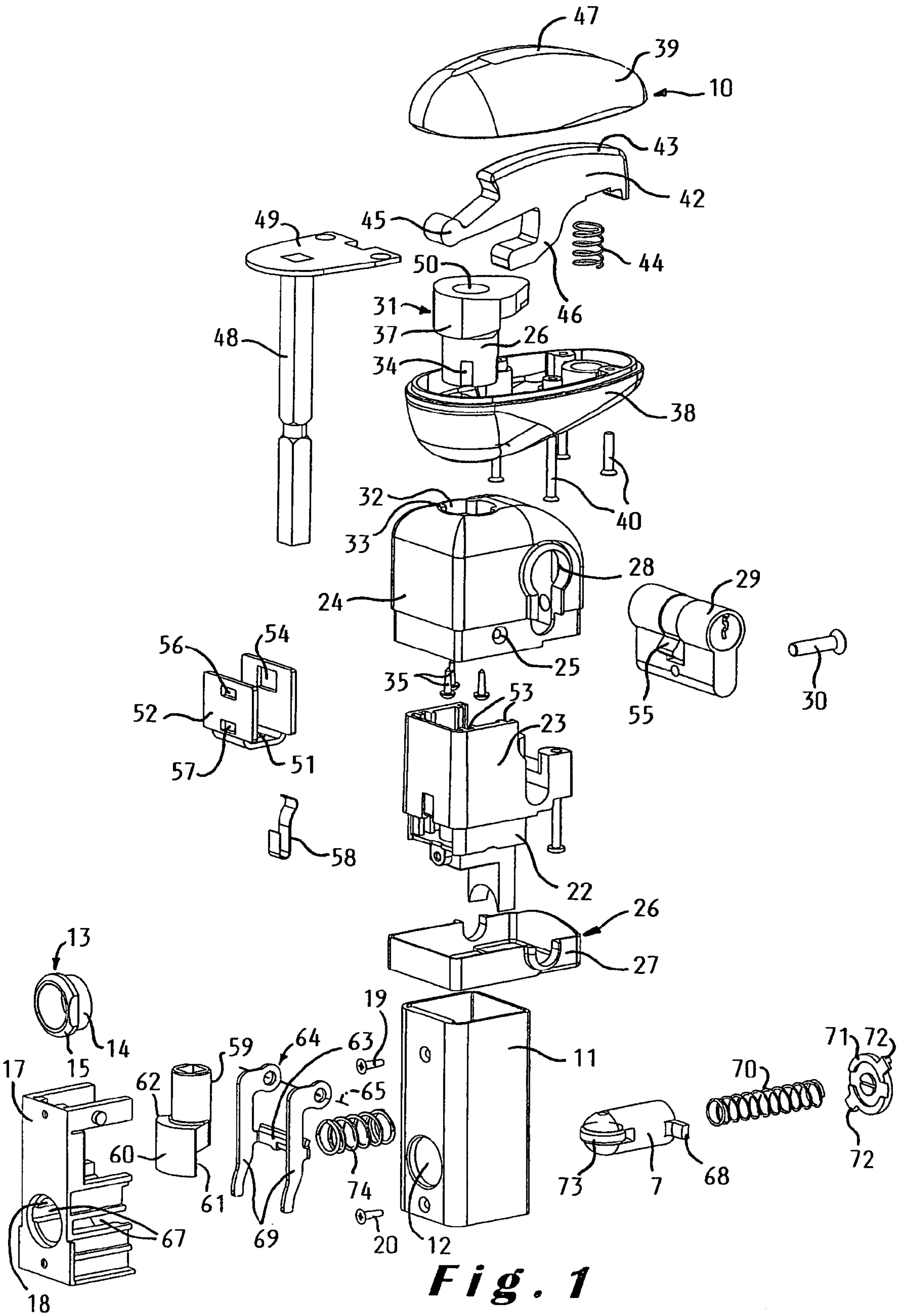
FIG. 1 is an exploded view of a self-latching device in accordance with the present invention.
Figure 2:
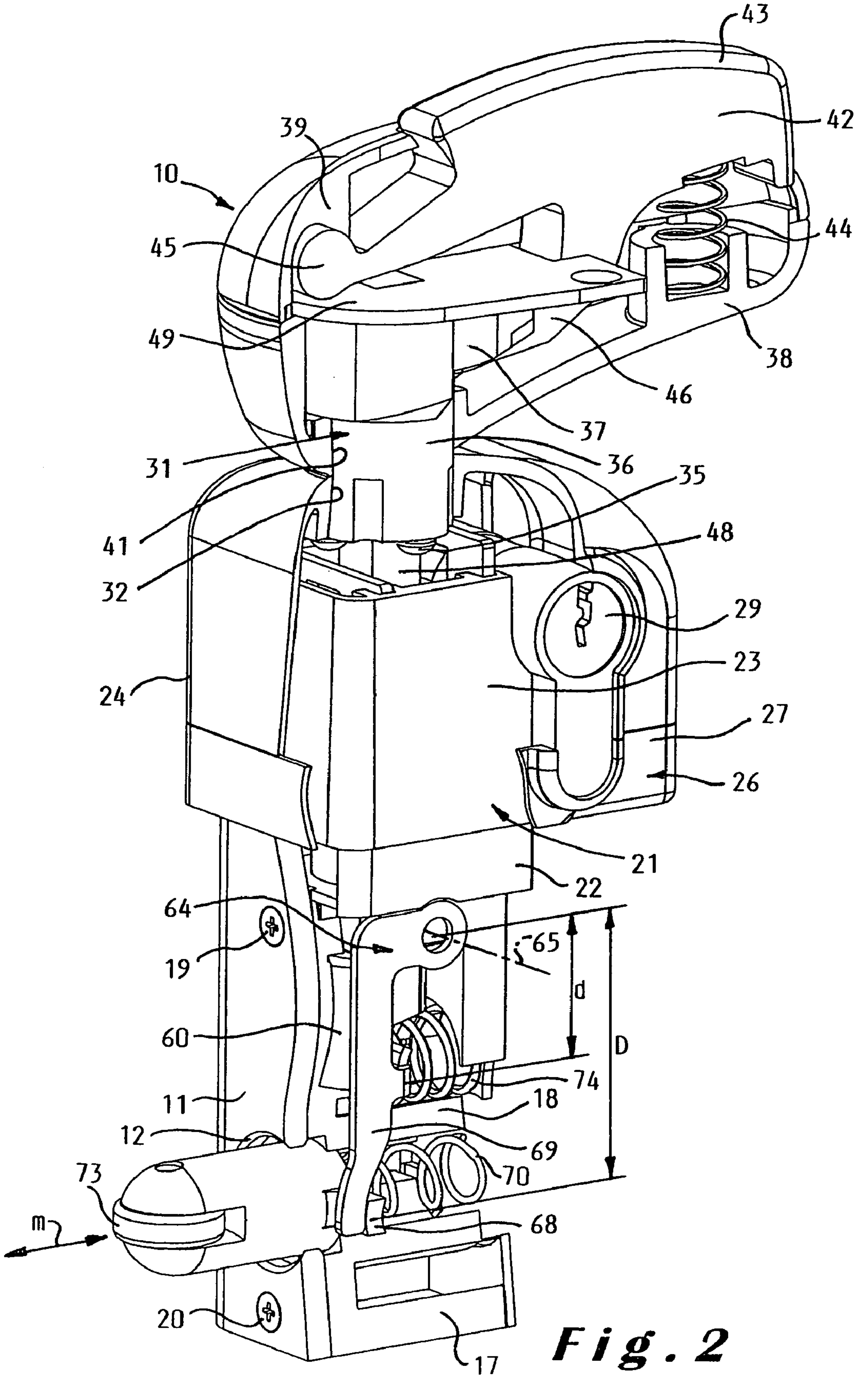
FIG. 2 is a sectioned perspective view on the assembled latching device illustrated in FIG. 1 with the latch bolt in its latching position.
Figure 3:
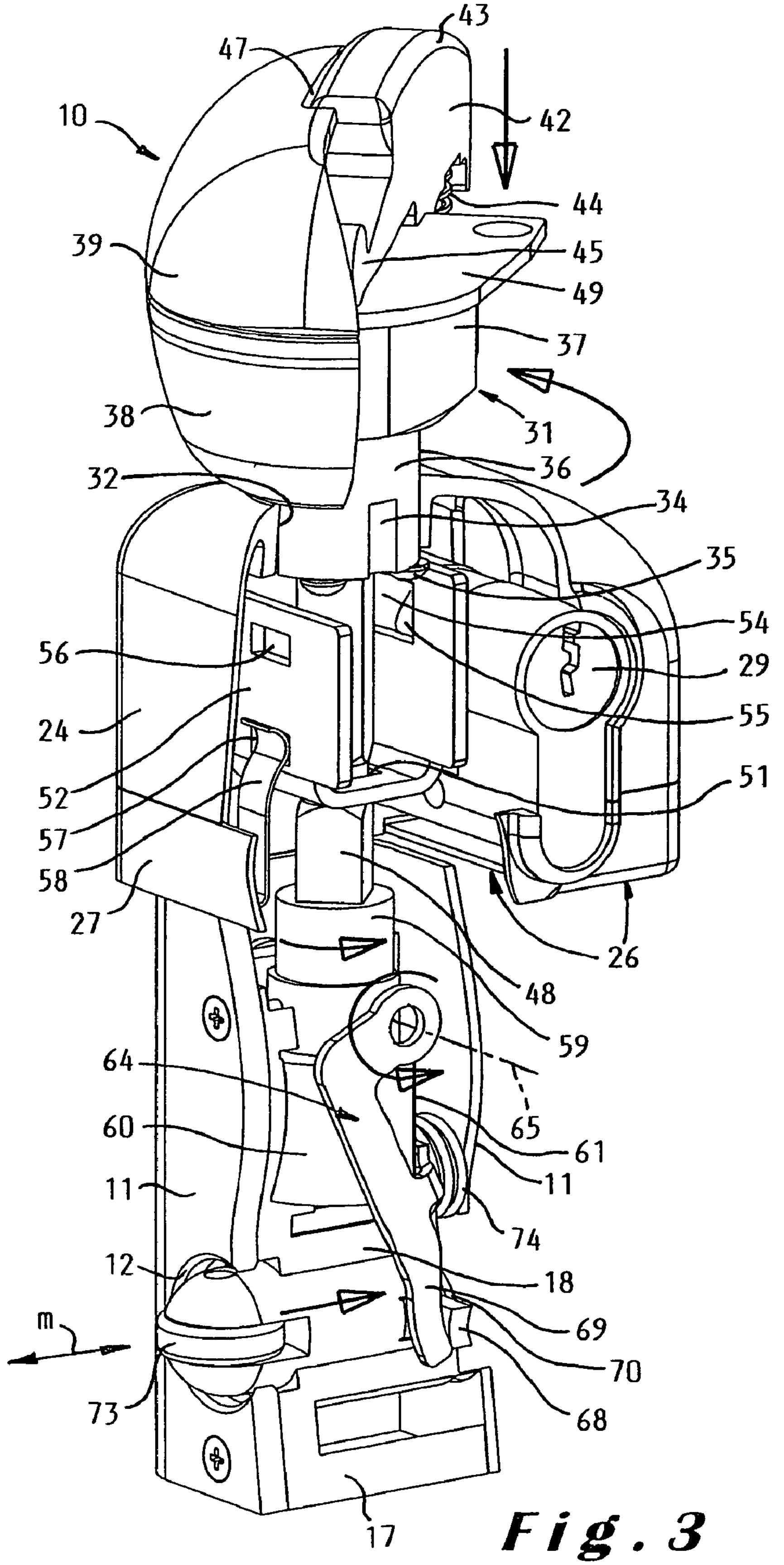
FIG. 3 is the same view as FIG. 2 but with the operator knob turned to withdraw the latch bolt in its retracted position.
Figure 4:
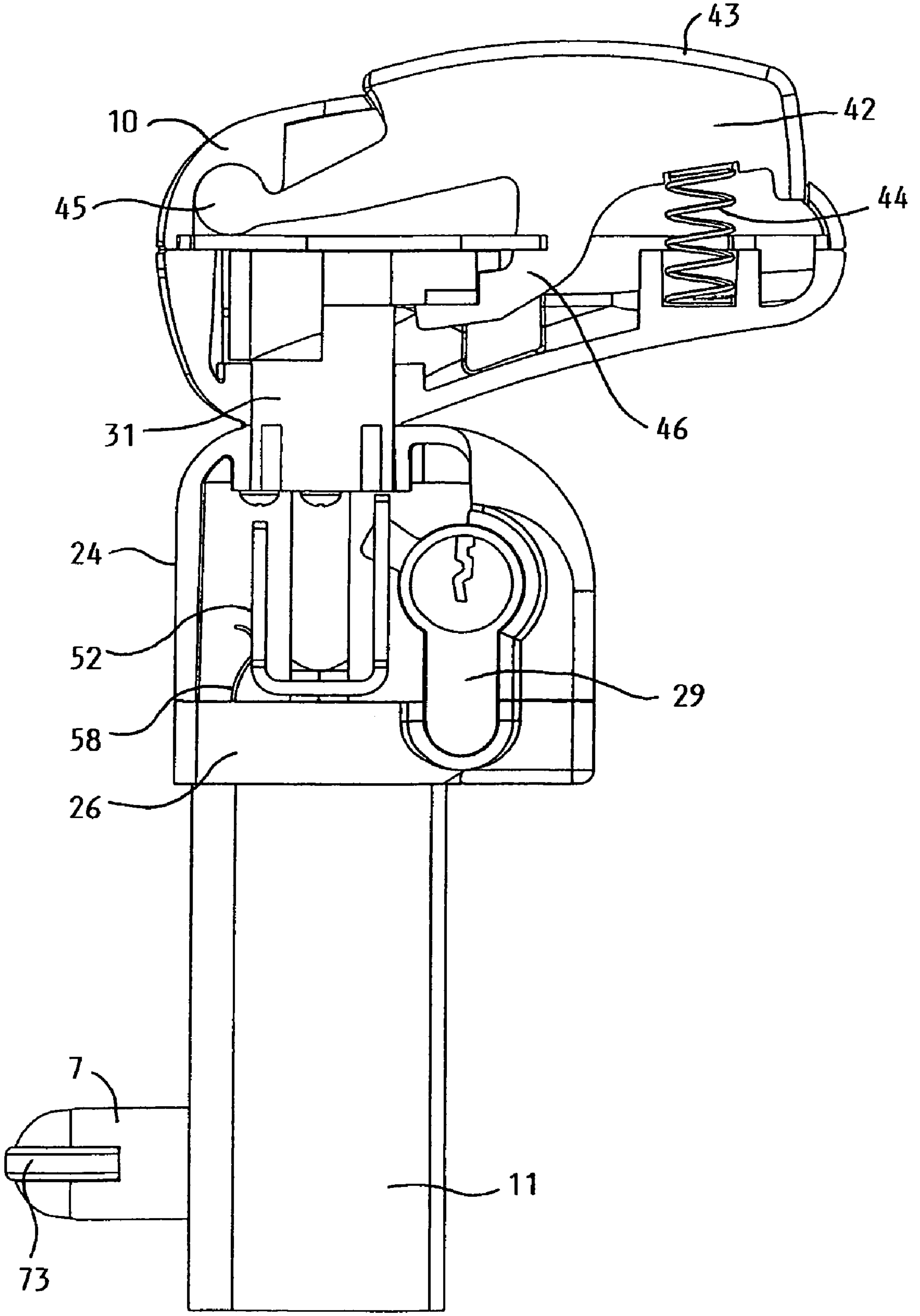
FIG. 4 is a sectioned side elevation of the latching device illustrated in the previous Figures with the latch bolt in its latching position and with the operator knob locked with respect to the frame of the latching device.
Figure 5:
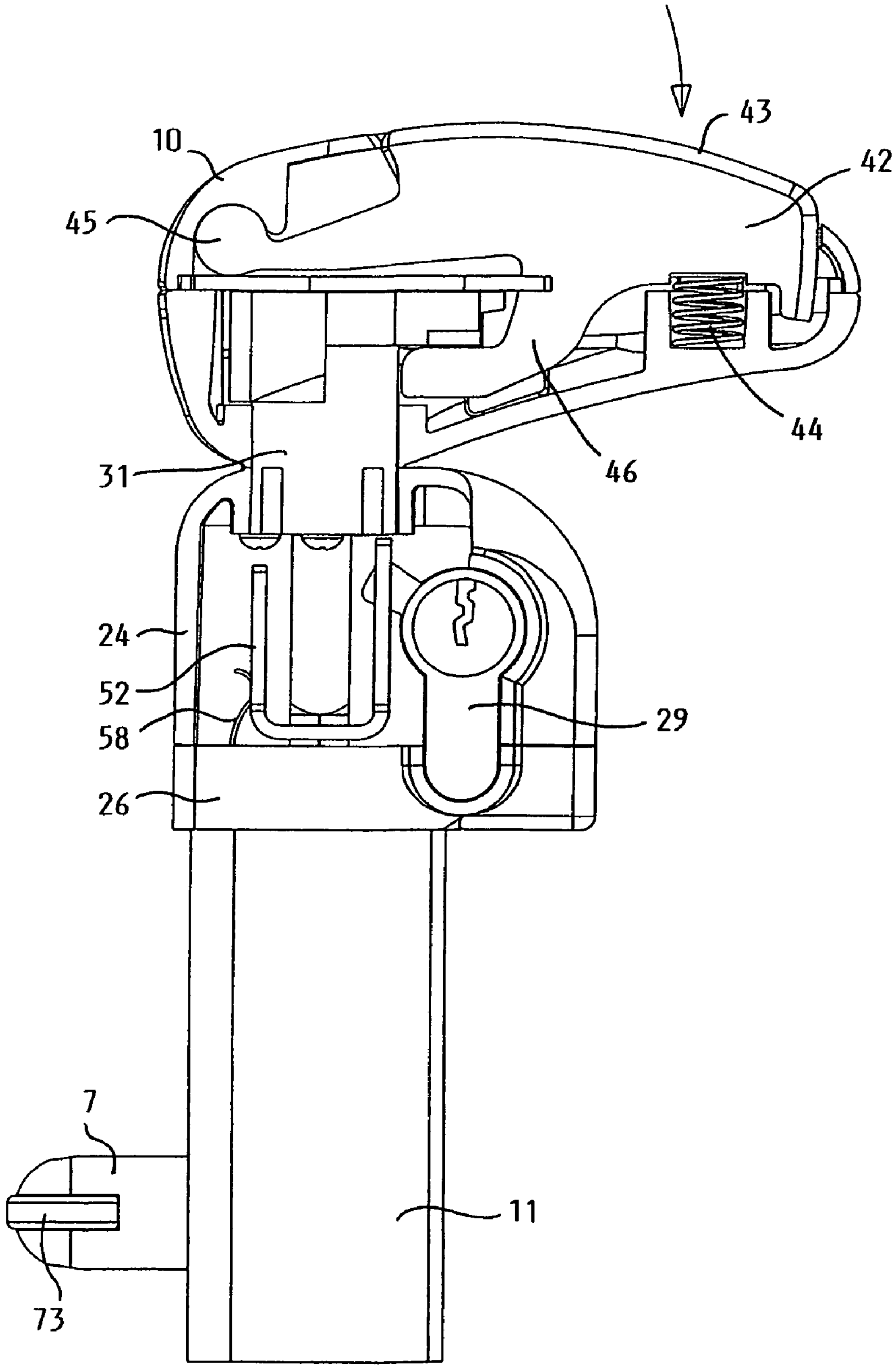
FIG. 5 is the same view as FIG. 4 but with the operator knob unlocked with respect to the frame of the latching device by having depressed the safety element on the operator knob.
Figure 6:
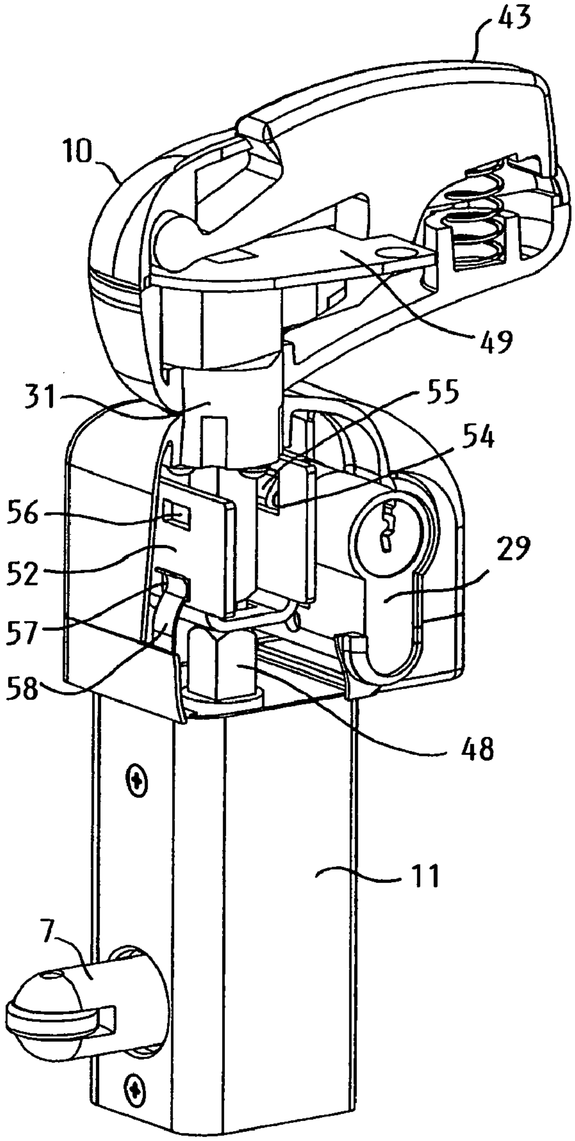
FIG. 6 is a sectioned perspective view on the latching device illustrated in the previous figures illustrating the operator shaft in its unlocked position with respect to the frame of the latching device.
Figure 7:
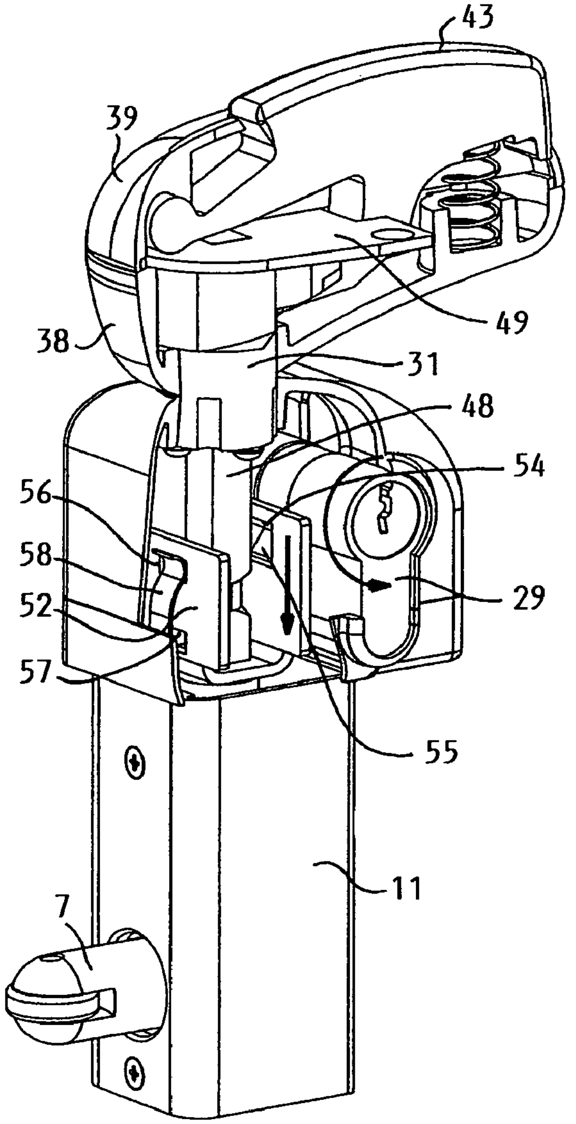
FIG. 7 is the same view as FIG. 6 but with the operator shaft locked position with respect to the frame of the latching device by means of the key operated locking mechanism.
Figure 8:
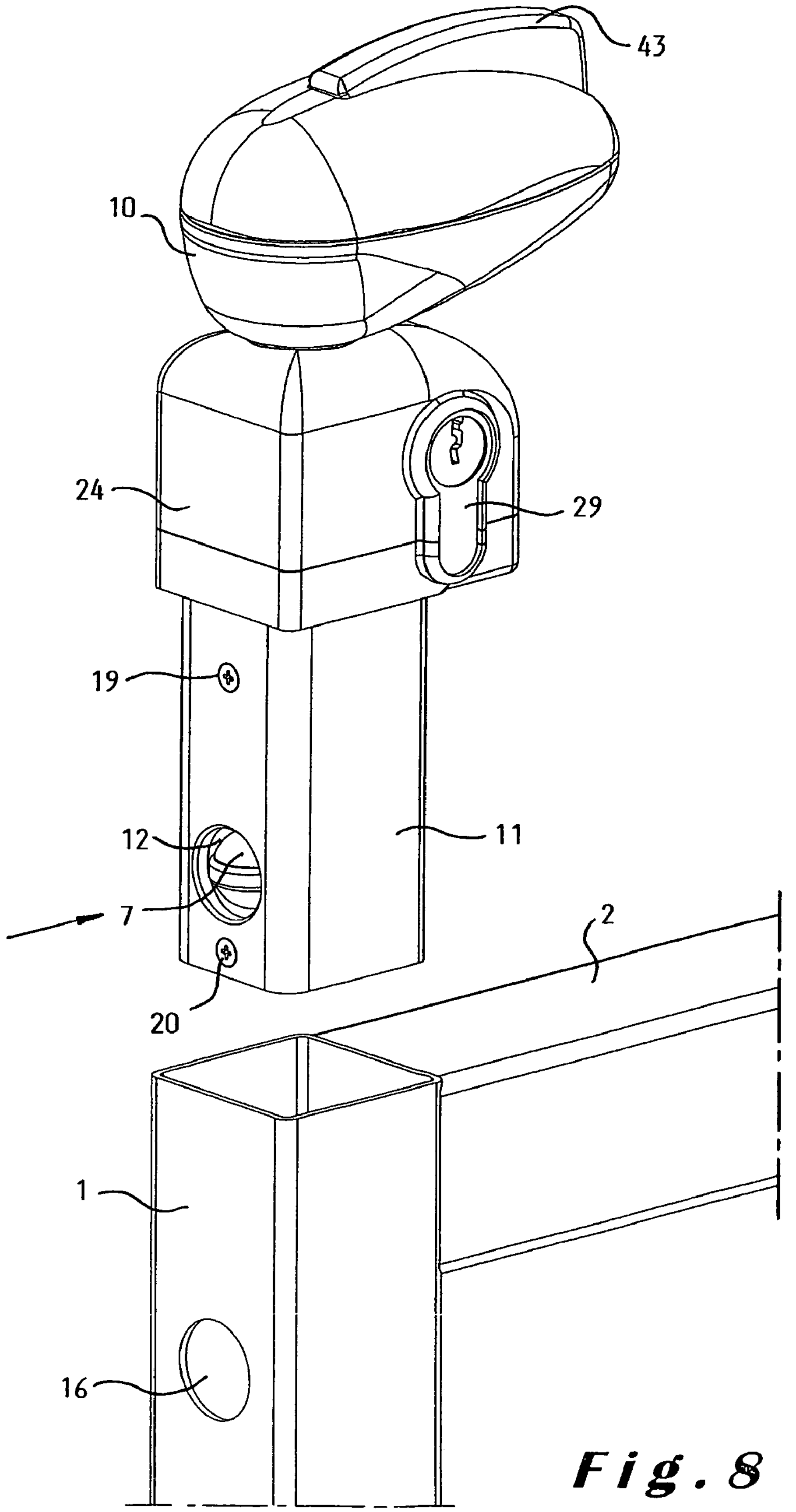
FIGS. 8 to 10 shows the successive steps for mounting the self-latching device illustrated in the previous figures in a vertical tubular member of the gate.

The self-latching device illustrated in the drawings is intended to be mounted in an upright position onto a hinged closure member 2, in particular a gate or a door. The device is more particularly intended to be mounted in a vertical tubular member 1 which is either an integral part of the gate 2 (see FIGS. 8 to 10) or which is fixed to the gate 2 (see FIG. 12). The tubular member 1 can be fixed for example by means of self drilling screws to the gate 2 so that no holes have to be drilled in the gate. The latching device comprises a latch bolt 7 which co-operates with a striker element 3 on an opposite post 5. This striker element 3 can also be fixed by means of self drilling screws 4 to the post 5 (see FIGS. 11 and 12). The post may be a fixed post, in particular a fence post 5, but it may also be another closure member such as the other gate member of a double gate.

Figure 11:
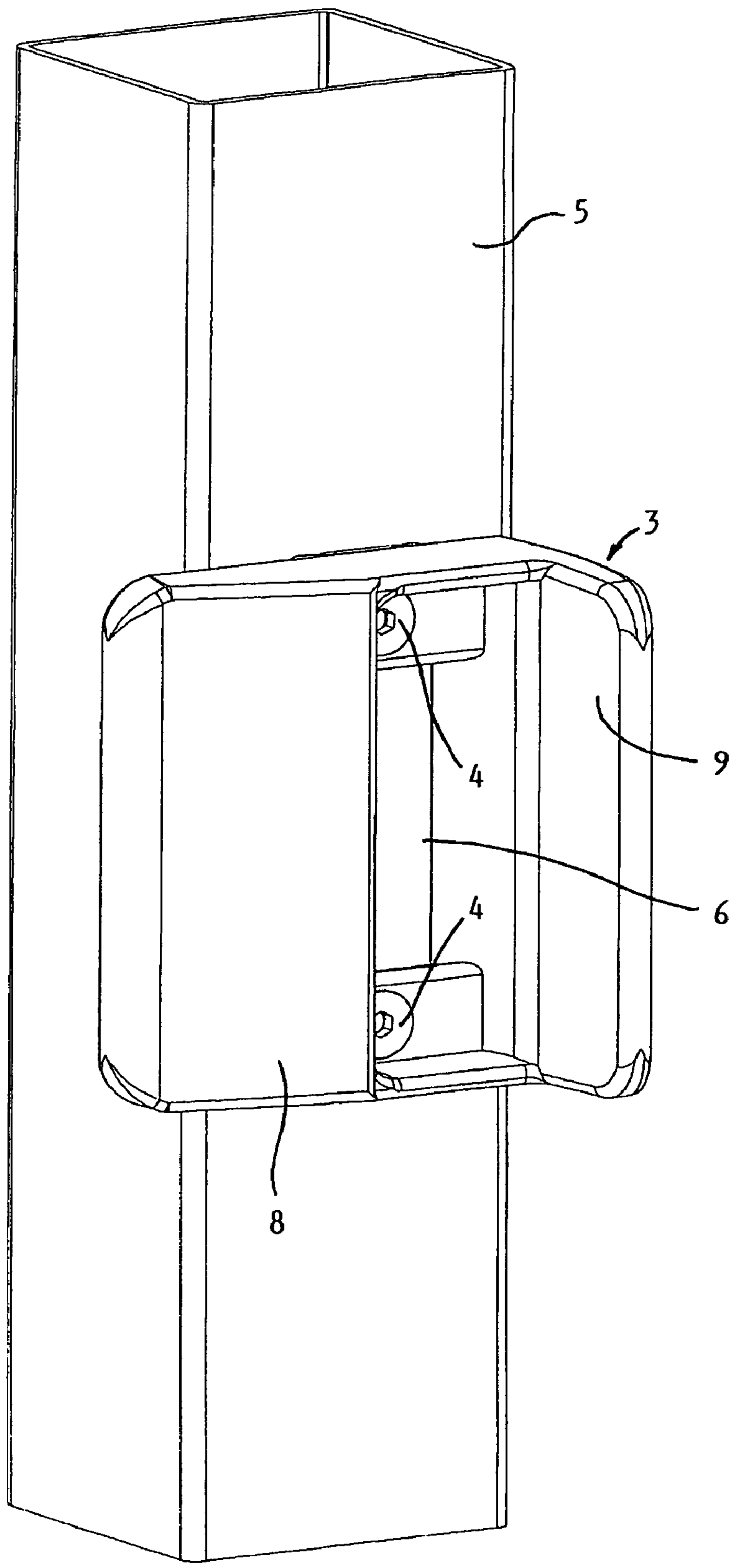
FIG. 11 is a perspective view on a fence post having a striker element arranged to co-operate with the latch bolt of the latching device illustrated in the previous figures mounted thereon.
Figure 12:
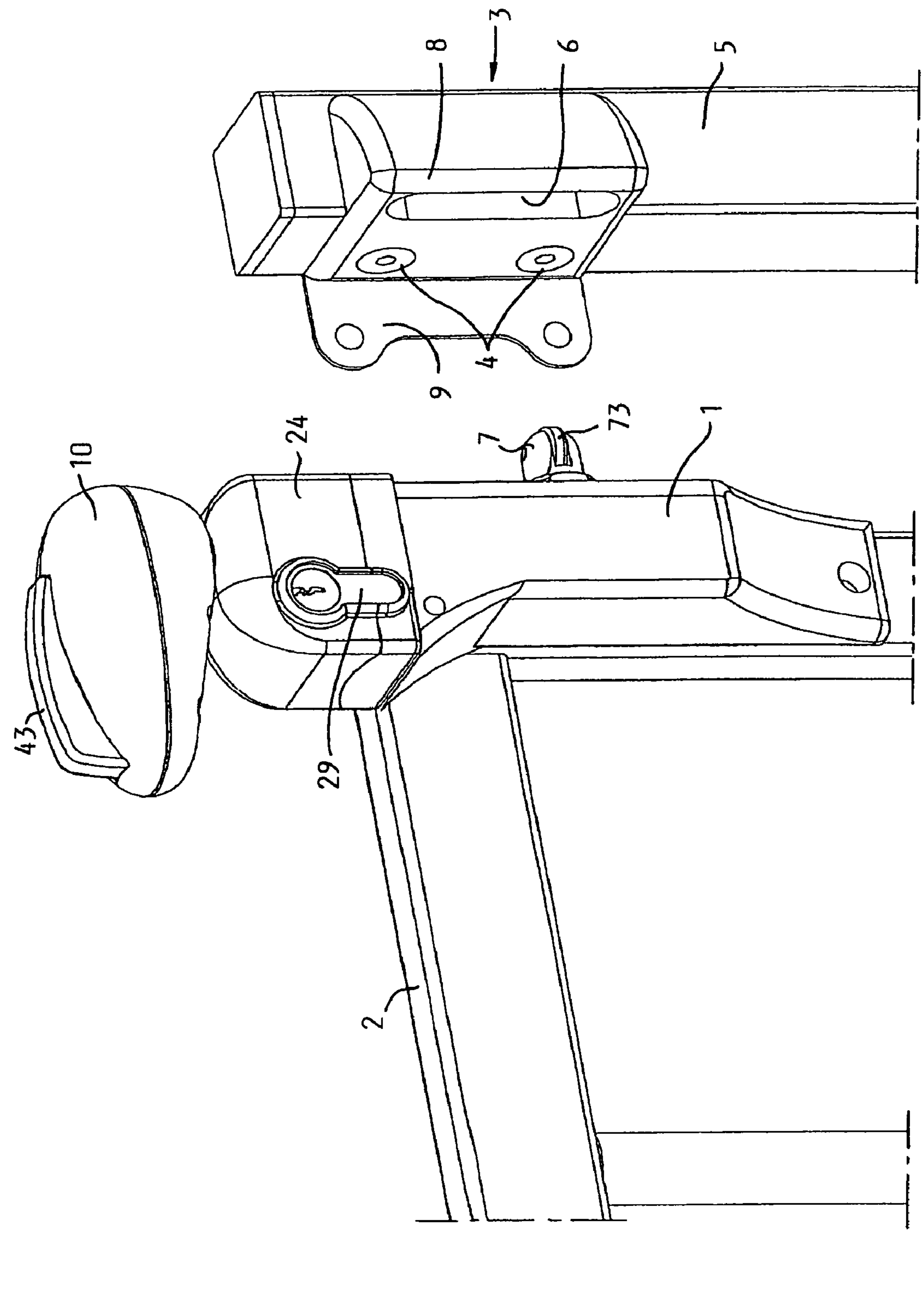
FIG. 12 shows the latching device illustrated in the previous figures mounted in a vertical tubular member fixed to the front or back side of a gate and the striker element mounted on an opposite fence post.
Figure 13:
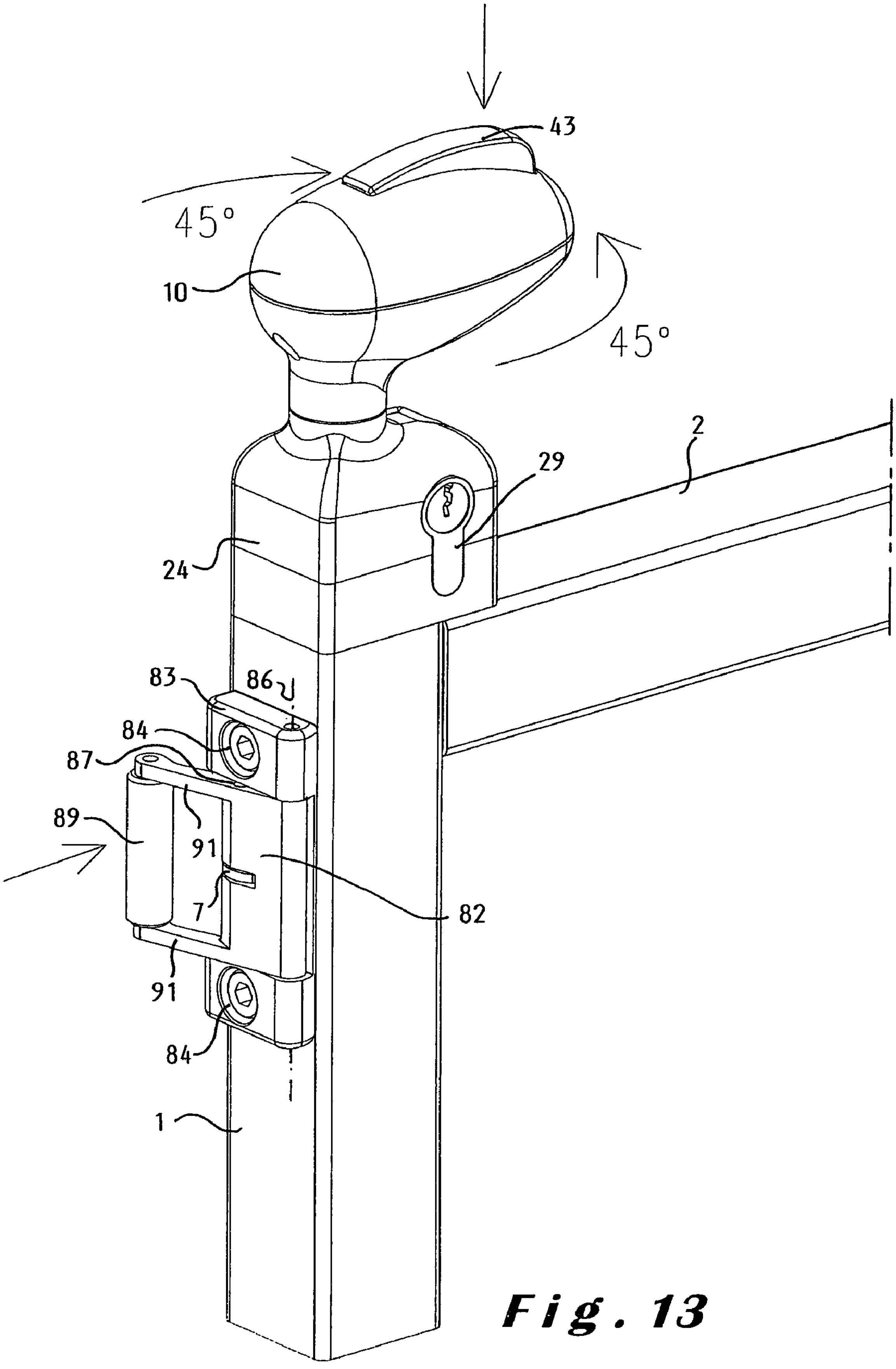
FIG. 13 shows a perspective view on a gate having a self-latching device according to a variant embodiment of the invention mounted thereon.

The striker element 3 comprises an elongate cavity 6 arranged to receive the latch bolt 7, an inclined surface 8 arranged to push the latch bolt 7 in when closing the gate 2 and a stop 9 for the gate 2. In FIG. 12 the part of the striker element 6 with the elongate cavity 6 is situated in front of the post 5 while in FIG. 11 this part is situated on the lateral side of the post so that in both situations the gate is fastened opposite the post.

As can be seen in the drawings, the latching device according to the invention comprises operator means, in particular an operator knob or handle 10, and a latch bolt operating mechanism which extends from the operator knob 10 through the tubular member 1 down to the latch bolt 7. In this way, the latch bolt 7 can be provided at the desired height on the gate 2. It can be provided more particularly at a relatively high height so that pulling or pushing to the upper edge of the gate does not cause large torsion stresses in the gate. Another advantage of the laterally projecting latch bolt 7 is that, by providing a vertical elongate slot or cavity 6 in the striker element 3, the gate may sag somewhat without hampering the functioning of the latching device.

FIGS. 1 to 12 illustrate a first embodiment of the latching device according to the invention wherein the operator knob 10 is situated on top of the gate 2, wherein the latch bolt 7 projects in a substantial horizontal position laterally out of the gate 2 and wherein the latch bolt operating mechanism, interposed between the operator knob 10 and the latch bolt 7, is of such a compact construction that it can be arranged within the tubular member 1 whilst still assuring a sufficiently large stroke of the latch bolt 7.

Figure 9:
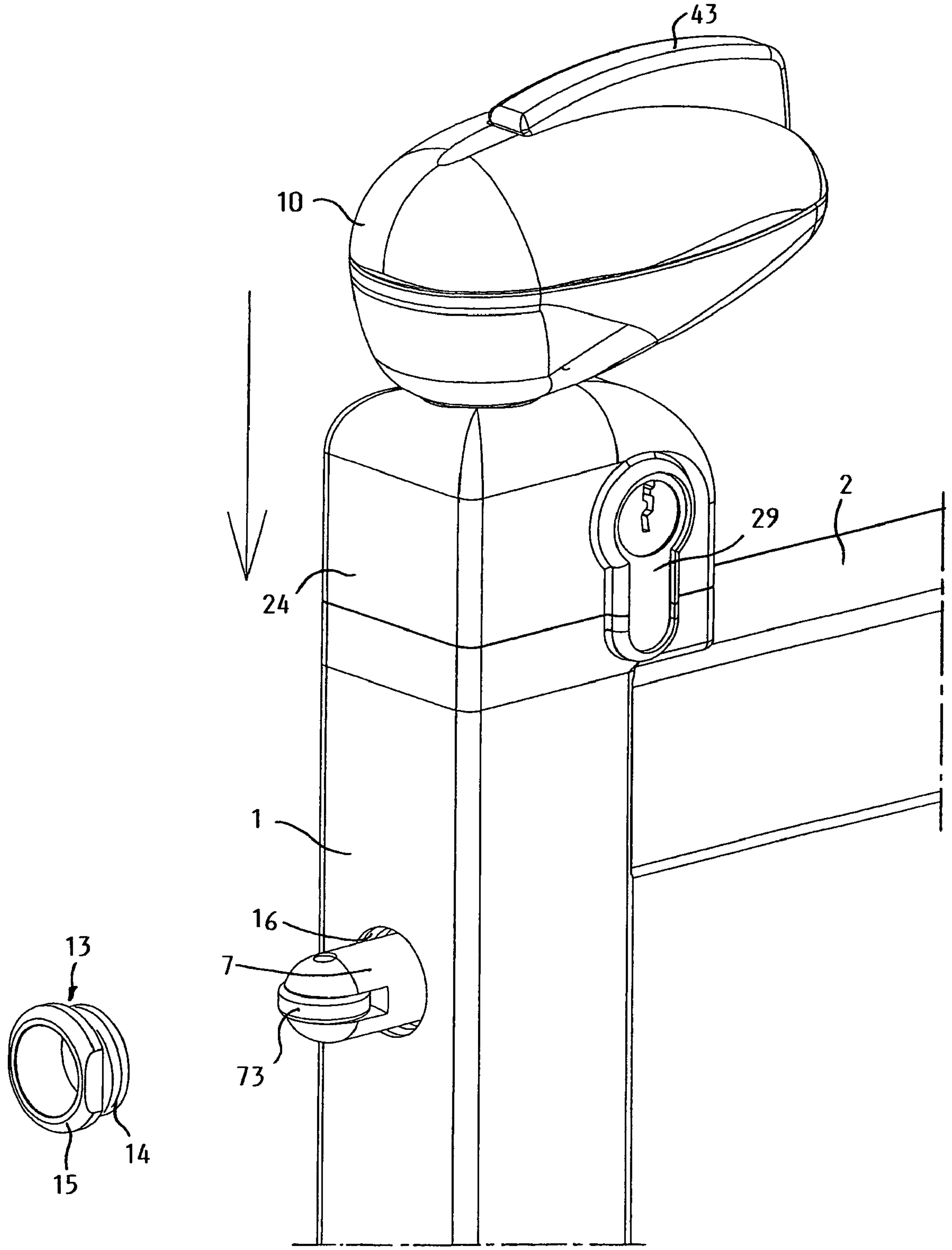
Figure 10:
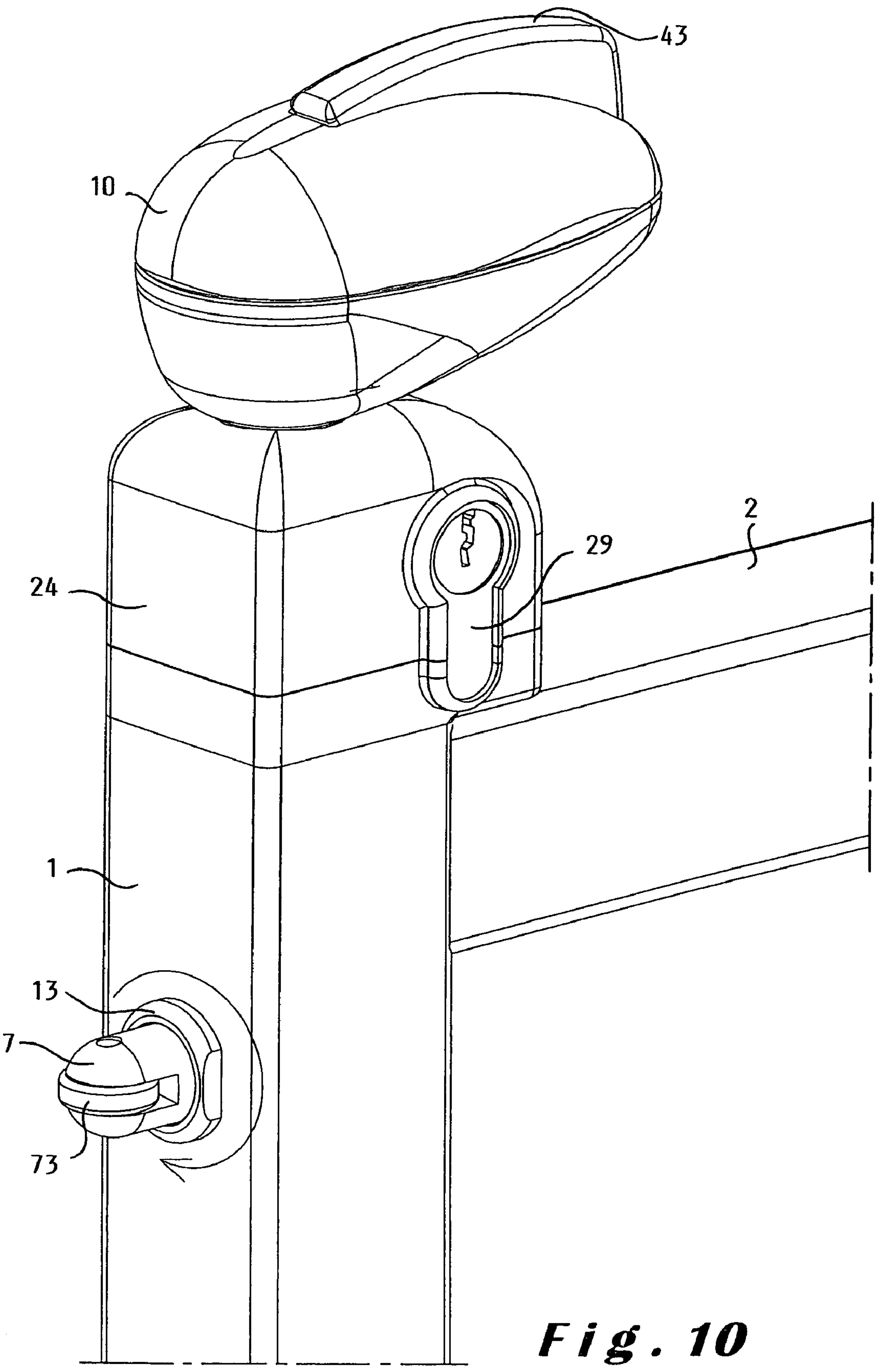

In this first embodiment the latching device comprises first of all a frame composed of different frame components. A first frame component is a tube section 11 which is preferably made of metal such as aluminium. On one lateral side the tube section 11 has an opening 12 for the latch bolt 7. This opening 12 is provided with an internal screw thread enabling to screw a bushing 13 over the latch bolt 7 into this first frame component 11 to fix the latching device in the tubular member 1. This bushing 13 comprises indeed an externally screw threaded portion 14 which can be screwed in the opening 12 in the frame and a shoulder 15 abutting the lateral side of the tubular member 1 when the bushing 13 is screwed, as illustrated in FIGS. 9 and 10, through a corresponding lateral opening 16 in the tubular member 1. On the opposite side of the opening 12, the tube section 11 is provided with a further opening (not shown) enabling to insert the latch bolt 7 from that side in the frame of the latching device. An advantage of fixing the latching device by means of the bushing 13 in the vertical tubular member 1 is that only one opening 16 has to be drilled therein. Moreover, the bushing 13 provides an additional guide for the latch bolt 7, guiding the latch bolt 7 even somewhat outside the tubular member 1, so that it slides more easily when closing the gate 2.

A second frame component 17 fits entirely within the tube section 11 and provides a guide 18 for the latch bolt 7, more particularly so that the latch bolt can move according to a horizontal direction m. This frame component 17 is fixed by means of two small screws, namely an upper 19 and a lower screw 20, to the first frame component or tube section 11. The second frame component 17 is preferably moulded from a plastic material.

A third frame component 21 comprises a lower portion 22 which fits into the upper part of the first frame component 11 and which is fixed thereto by means of the upper screw 19. The upper portion 23 of the third frame component 21 extends above the first frame component 11 and fits in a fourth frame component 24. Whilst the third frame component 21 is preferably also moulded from a plastic material, the fourth frame component 24 is preferably made of metal. The fourth frame component 24 forms indeed a visible part of the casing of the latching device, more particularly a cap 24, which protrudes on top of the tubular member 1 as can be seen in FIGS. 9 to 10 and 12.

The fourth frame component or cap 24 is fixed by means of screws applied through little holes 25 in the lower edge of the cap 24 to the third frame component 21. These holes 25 and the screws applied therein are covered by means of a bottom cover 26 having a flange 27 fitting around the lower edge of the cap 24. The cap 24 is provided with two opposite openings 29 arranged to receive a key operated lock cylinder 29. The cylinder 29 is fixed by means of a bolt 30 to the cap 24. This bolt 30 is also covered by means of the flange 27 of the bottom cover 26 so that the cylinder 29 cannot be removed without removing the latching device out of the tubular member 1. The bottom cover 26 is indeed locked between the cap 24 and the upper side of the gate and of the tubular member 1 when the latching device is mounted onto the gate 2.

A fifth frame component 31 is fixed in a hole 32 in the top of the cap 24. The hole 32 is provided with teeth 33 co-operating with grooves 34 on the fifth frame component 31 to prevent any mutual rotation. The fifth frame component 31 is inserted from the upper side vertically in the hole 32 and is fixed therein by means of little screws 35. These screws 35 are screwed in the bottom side of the fifth frame component 31 and have a head engaging the inner side of the cap 24 so that the fifth frame component 31 cannot be removed from the hole 32. The fifth frame component 31 is preferably moulded from a plastic material wherein the screws 35 can be screwed without having to tap first holes therein.

The fifth frame component 31 has a cylindrical portion 36 and, above this cylindrical portion 36, a laterally protruding flange portion 37. When mounted on the cap 24, the cylindrical portion extends right above the hole 32 in the cap 24 and serves as a pivot for the operator knob 10. The operator knob consists of two parts, namely a lower part 38 and an upper part 39 fitting on the lower part 38 and fixed thereto by means of screws 40. The lower knob part 38 has an opening 41 wherein the fifth frame component 31 is inserted before being fixed to the cap 24. In this way, the lower knob part 38 is caught between the flange portion 37 of the fifth frame component 31 and the upper side of the cap 24 so that the lower knob part 38 can pivot with its opening 41 around the cylindrical portion 36 of the fifth frame component 31.

The operator knob 10 also comprises means 42 for locking the operator knob 10 with respect to the frame of the latching device. These locking means 42 are movable by means of an additional operator element, in particular by means of a push element 43, between a locked position (illustrated in FIG. 4), wherein the operator knob 10 is locked with respect to the frame, and an unlocked position (illustrated in FIG. 5) wherein the operator knob 10 can be rotated about the cylindrical portion 36 of the fifth frame component 31. A compression spring 44 is provided between the locking means 42 and the lower knob part 38 to bias the locking means 42 in the locked position. The locking means 42 have the shape of a lever which has a thickened rounded extremity 45 which is received in a recess in the upper knob part 39 so that it can pivot with respect to this upper knob part 39. At its bottom side, the lever has a curved arm 46, the free extremity of which is received in a recess in the bottom surface of the flange portion 37 of the fifth frame component 31 so that the operator knob 10 is locked with respect to this fifth frame component 31. The upper side of the lever forms the additional operator element or push element 43 which protrude through a slot 47 in the upper knob part 39 out of the operator knob 10. When taking the knob 10 in his hands one can at the same time depress the push element 43 against the action of the compression spring 44 so that the lever rotates about its thickened extremity 45 and the curved arm 46 moves downwards. In this way, the free extremity of the curved arm 46 is released from the recess in the flange portion 37 of the fifth frame component 31 so that the operator knob 10 is unlocked and can be rotated with respect to the frame. In order to unlatch the gate two successive operations are thus required: first the push element 43 has to be pushed in to unlock the knob 10 and secondly the knob 10 has to be turned. Such two successive operations provide a safety system preventing small children from opening the gate, even when the knob 10 is in their reach.

The self-latching device according to the present invention also comprises a latch bolt operating mechanism to move the latch bolt 7 by means of the operator knob 10 from its latching to its retracted position. This mechanism comprises several components.

A first component of the latch bolt operating mechanism is an operator shaft 48 having a square cross-section. The upper extremity of the operator shaft 48 is welded to a horizontal plate 49 fixed between the upper and the lower knob parts 38 and 39. The operator shaft is guided though a central cylindrical hole 50 in the fifth frame component 31 so that when the knob rotates around the cylindrical portion 36 of this fifth frame component 31 the handle shaft rotates within the cylindrical hole 50 thereof.

Within the third frame component 21 enclosed by the fourth frame component or cap 24 the operator shaft 48 extends through a square hole 51 in a locking element 52. This locking element 52 is made of a little metal plate folded according to a U-shape. The legs of this U-shape extend laterally beyond the bottom part wherein the hole 51 is provided and are slidably received in vertical guides 53 in the third frame component 21. One of the legs is provided with an opening 54 arranged to co-operated with the driving dog 55 of the lock cylinder 29 so that when rotating the key operated cylinder in one direction the locking element 52 is lifted and when rotating the key operated cylinder in the opposite direction, the locking element 52 is lowered (see FIGS. 6 and 7). The other leg of the U-shaped locking element 52 is provided with an upper opening 56 and with a lower opening 57. A leaf spring 58 fixed to the third frame component 21 engages the upper opening 56 in the lowermost position of the locking element 52 and the lower opening 57 in the uppermost position of the locking element 52 to keep the locking element stable in both of these extreme positions. In its lowermost position, the locking element 52 prevents any rotation of the operator shaft 48 with respect to the frame. In the uppermost position of the locking means 52, the square hole 51 is situated at a portion of the operator shaft 48 where the operator shaft has been rounded off so that it can rotate in the square hole 51. The latching device can thus be locked and unlocked by means of the key operated cylinder 29.

The lower end of the operator shaft 48 fits in a square hole in a plastic moulded component 59 (which may also be made of metal). A lower portion of this component is formed by a portion of a cylinder having an outer cylindrical wall portion 60 bearing against a corresponding surface in the first frame component 11 upon rotation of the operator shaft 48 and of thus of the plastic moulded component 59. The lower portion of this component 59 forms two cam elements 61 and 62 engaging a surface 63 of a follower element 64. This follower element 64 is arranged to transmit the motion of the cam elements to the latch bolt 7 and is movably mounted on the second frame component 17 is a direction having at least a component coinciding with the movement direction m of the latch bolt 7.

The cam elements 61 and 62 on the operator shaft 48 are formed by both edges of the lower portion of the component 59 which are situated at a distance from the longitudinal axis of the operator shaft 48. When rotating the operator shaft 48, the cam elements thus move according the a circular path having one component which coincides with the horizontal direction wherein the latch bolt 7 moves in the second frame component 17. In this way, the latch bolt can thus be retracted by rotating the operator shaft. The presence of two cam elements 61 and 62 on the operator shaft offers the advantage that the latch bolt can be retracted when rotating the operator knob in either direction. The latching device can thus be used both for a left and for a right swinging gate.

The follower element 64 is hingedly connected, at its upper end, about a hinge axis 65 to the second frame component 17 and has two arms 69 engaging at their lower ends the latch bolt 7. As already mentioned hereabove, the latch bolt 7 is guided in the second frame component 17. The latch bolt 7 is more particularly cylindrical and is received in a cylindrical guide channel 18 in the second frame component 17. In this way, a maximum contact area can be provided thus reducing the frictional forces between the latch bolt 7 and the second frame component 17. In the wall of the cylindrical channel 18 two opposite slots 67 are provided wherein two lugs 68 protruding from the cylindrical portion of the latch bolt 7 are guided. These lugs 68 extend through the slots 67 in the second frame component 17 and are each engaged by an arm 69 of the follower element 64.

The hinge axis 65 of the follower element 64 is preferably a horizontal axis which is substantially perpendicular to the movement direction m of the latch bolt 7 and which is located at a distance D from the location where the follower element 64 engages the lugs 68 of the latch bolt 7. In the illustrated embodiment, the surface 63 of the follower element 64 which is engaged by the cam elements 61 and 62 on the operator shaft 48 is located at a distance d, smaller than the distance D, from the hinge axis 65 of the follower element 64. An important advantage of such an arrangement (which can also be operated by an alternative mechanism, such as a pulling mechanism, which does not comprise a pivoting operator shaft) is that the stroke of the latch bolt is larger than the stroke of the cam elements 61, 62 on the operator shaft so that the plastic moulded component 59, and the guide provided therefor by the second frame component 17 can be kept compact whilst still enabling a relatively large stroke of the latch bolt, in particular a stroke larger than 10 mm, preferably a stroke larger than or equal to 15 mm. Such a large stroke offers the advantage that the latch bolt can effectively engage the cavity in the striker element, even in case of some variation in the distance between the fixed post and the gate.

By rotation of the operator shaft 48 in one direction, one of the cam elements 61 or 62 causes the follower element 64 to rotate backwards about the hinge axis 65 so that the follower element 64 retracts the latch bolt 7 against a latch bolt spring 70. This spring 70 is a compression spring arranged between the latch bolt and the first tubular frame component 11 to bias the latch bolt 7 into its extended or latching position. In order to achieve an optimal guiding of the latch bolt, this latch bolt has a total length which is substantially equal to the outer width of the first tubular frame component 11. To house the latch bolt spring 70, the latch bolt has an axial hole in its back side. As mentioned already hereabove the tubular frame component 11 is provided with a lateral opening enabling to insert the latch bolt and the latch bolt spring in the second frame component 17 which is inserted first in tubular frame component 11. A small cap 71 is provided to close the opening in the tubular frame component 11. This cap 71 has two lugs 72 which can engage behind the wall of the tubular frame component 11 when rotating the cap over a certain angle. Alternatively, the cap 71 could be provided with a screw thread and could be screwed in the opening in the tubular frame component 11.

Due to the fact that the latch bolt spring can be housed in the latch bolt itself, it has a maximum length so that a minimum force is required to move the latch bolt towards its retracted position. The latch bolt spring preferably has a spring constant such that a force smaller than 30 N, preferably smaller than 20 N, has to be exerted onto the latch bolt (7) to move it form its latching to its retracted position. The force required to push the latch bolt into its retracted position comprises for example about 10 N. A small resistance of the latch bolt against being pushed in is especially important for self-closing safety gates, closing for example automatically by means of spring-hinges, and which should be locked automatically even when the gate has only been opened over a small angle. In this respect the distal extremity of the latch bolt 7 is further preferably formed by a roll 73 arranged to roll over the inclined surface 8 of the striker element 3 when closing the gate 2. In this way, a very lightly closing gate can be achieved.

In the above described latching device, the latch bolt 7 is biased by the latch bolt spring 70 against the follower element 64. In the retracted position of the latch bolt 7 the latch bolt spring 70 therefore also urges the operator knob back to its rest position wherein it is locked again automatically by the locking means 42. To assure the return of the latch bolt and of the operator knob to their rest positions, a further compression spring 74 is provided between the tubular frame component 11 and the follower element 64. This spring 74 is stronger than the latch bolt spring so that it assures that the operator knob returns reliably to its rest position. However, when the latch bolt (7) is pushed in by contact with the striker element (3) when closing the closure member, the latch bolt operating mechanism doesn't move and only the relatively weak latch bolt spring has to be compressed enabling a light closing of the closure member.

In FIGS. 13 to 17 another embodiment of the self-latching device is illustrated wherein the follower element 64 is not biased by the latch bolt spring 70 against the latch bolt 7 but wherein this follower element 64 is provided on the latch bolt 7 and is more particularly an integral part thereof. Since the upper part of the latching device can be made in a same way as in the previous embodiment, no further description will be given thereof.

Figure 17:
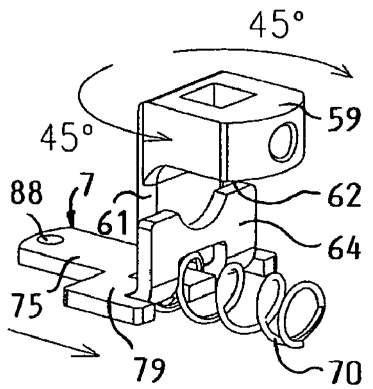
FIG. 17 is a perspective view on a detail of FIG. 16.
Figure 16:
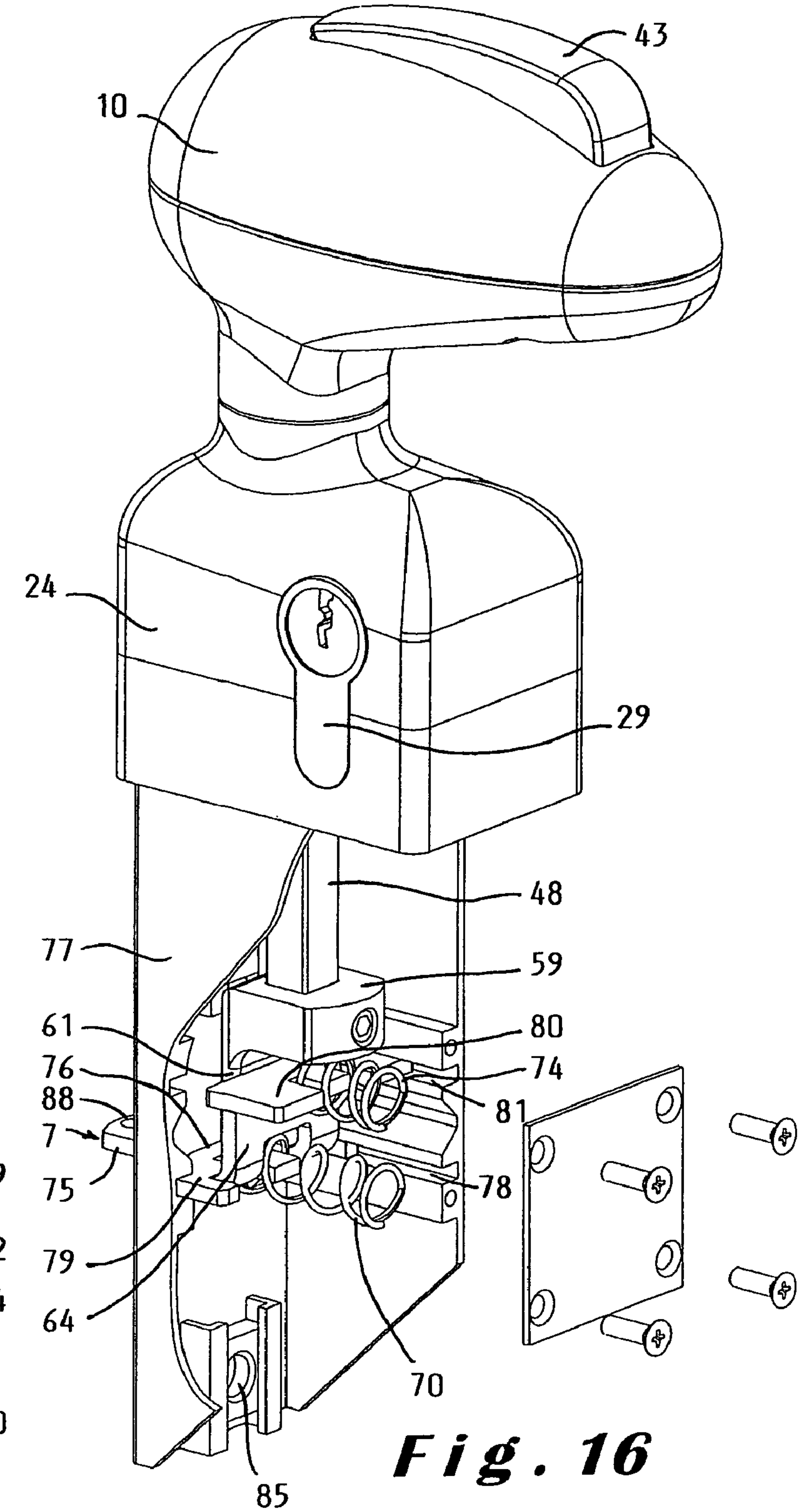
FIG. 16 is a sectioned perspective view on the latching device illustrated in FIG. 13.
Figure 18:
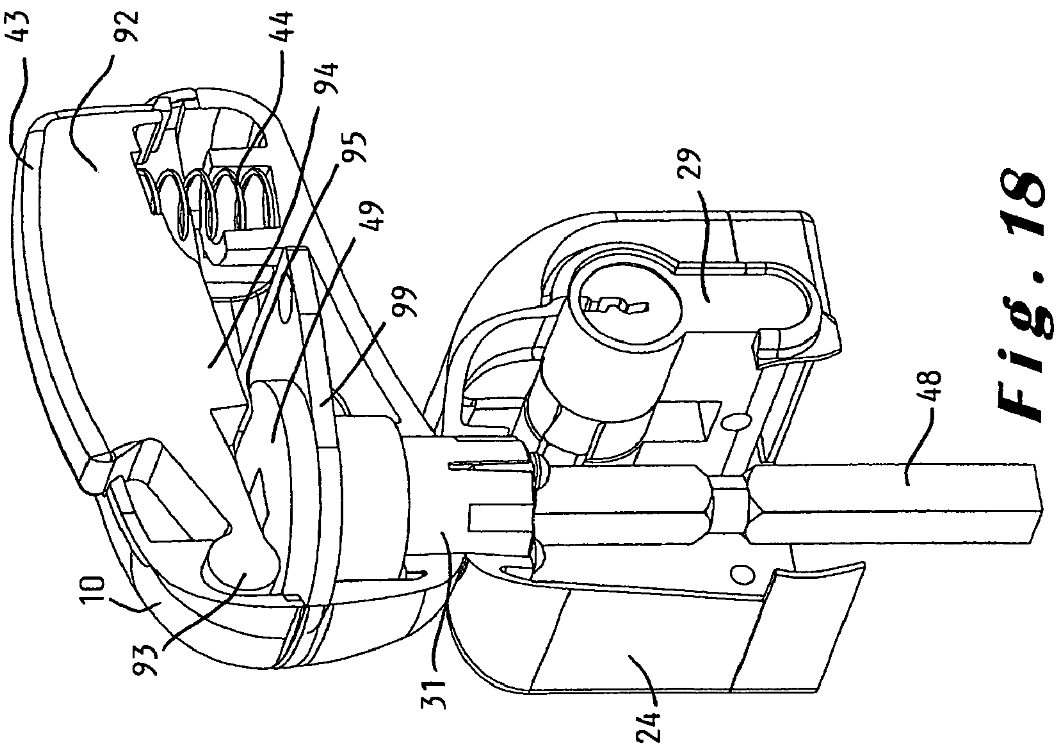
FIG. 18 is a sectioned perspective view on a part of still another embodiment of a self-latching device according to the invention.
Figure 19:
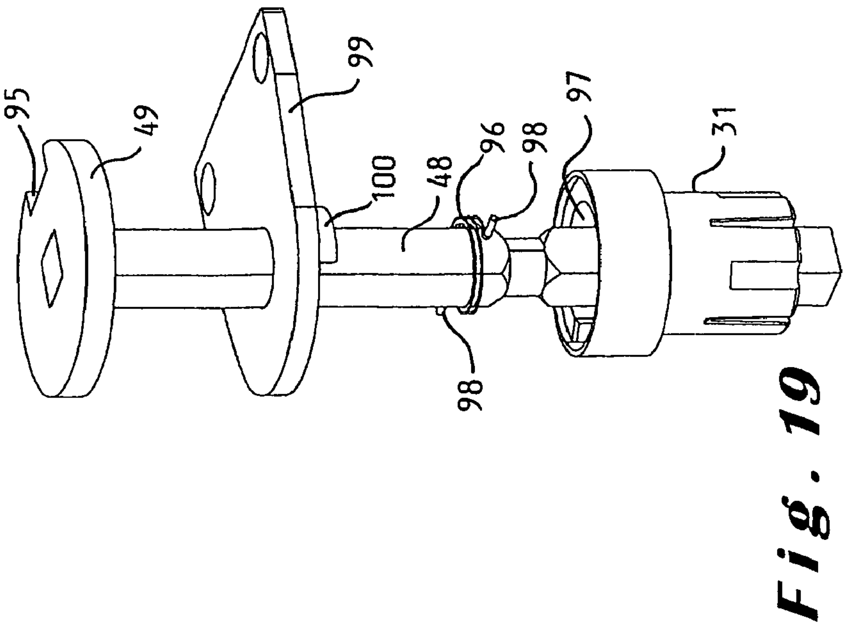
FIGS. 19 to 21 are perspective views and exploded views on a detail of the latching device illustrated in FIG. 18.
Figure 21:
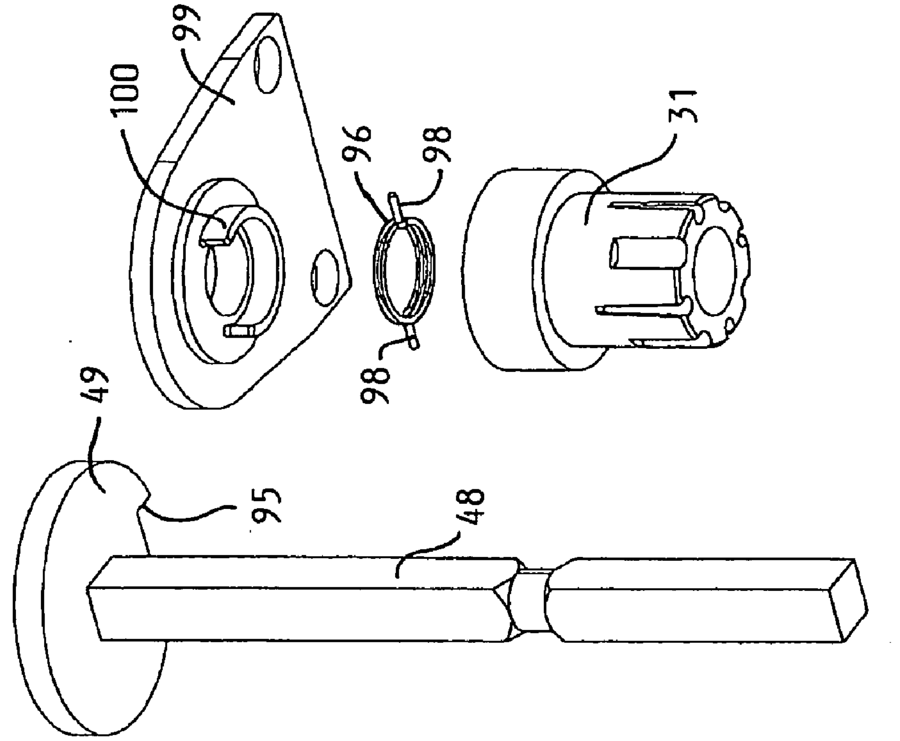
Figure 20:
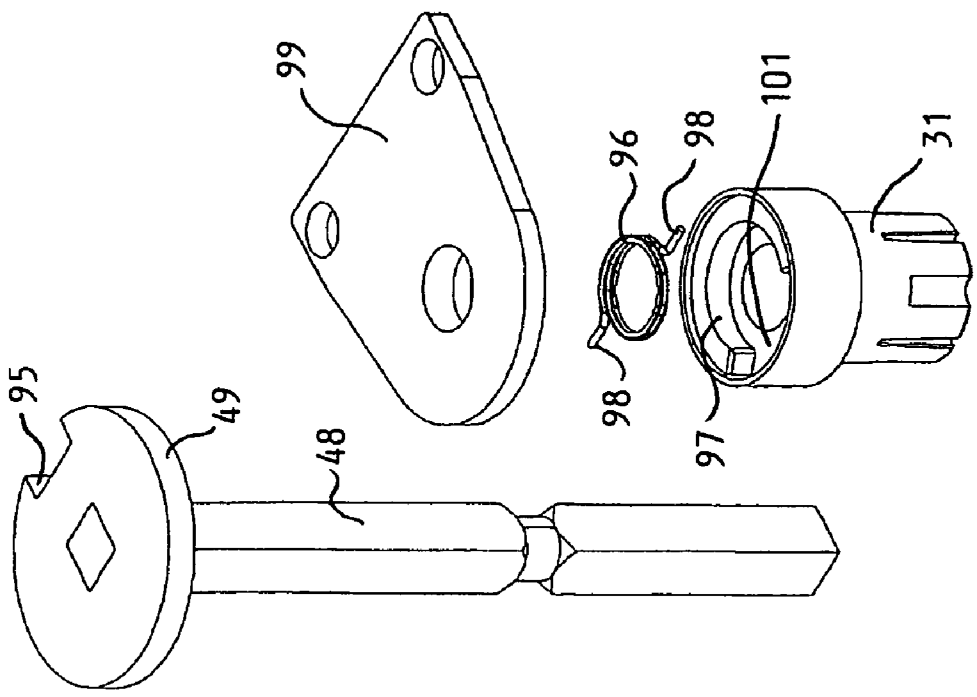

As can be seen in FIGS. 16 and 17, the latch bolt 7 is made of a metal plate forming a horizontal latch bolt part 7 and an upright part forming the follower element 64. The latch bolt part 7 has a narrower part 75 extending through a horizontal slit 76 out of a tubular frame component 77, which is a variant of the tubular frame component 11 of the previous embodiment, and which provides two opposite guides 78 for the lateral edges of the wider part 79 of the latch bolt part 7. The two cam elements 61, 62 on the operator shaft 48 have the same function as in the previous embodiment but have a somewhat different shape. When rotating the operator shaft in either one direction, one of the cam elements 61, 62 push the latch bolt 7 against the bias of the latch bolt spring 70 in the tubular frame component 77. Since the latch bolt 7 cannot move independently from the follower element 64 when closing the gate 2, a further follower element 80 is provided for biasing the operator shaft 48, under the action of the further compression spring 74, towards its rest position when releasing the operator knob 10. The further follower element 80 consists of a metal plate which is guided horizontally in two opposite guides 81 on the tubular frame component 77 and which has a surface, more particularly an edge surface, engaged by the two cam elements 61, 62. Also in this embodiment, only a small force is required to push the latch bolt 7 in the frame of the latching device when closing the gate since only the latch bolt spring 70 has to be compressed.

Figure 14:
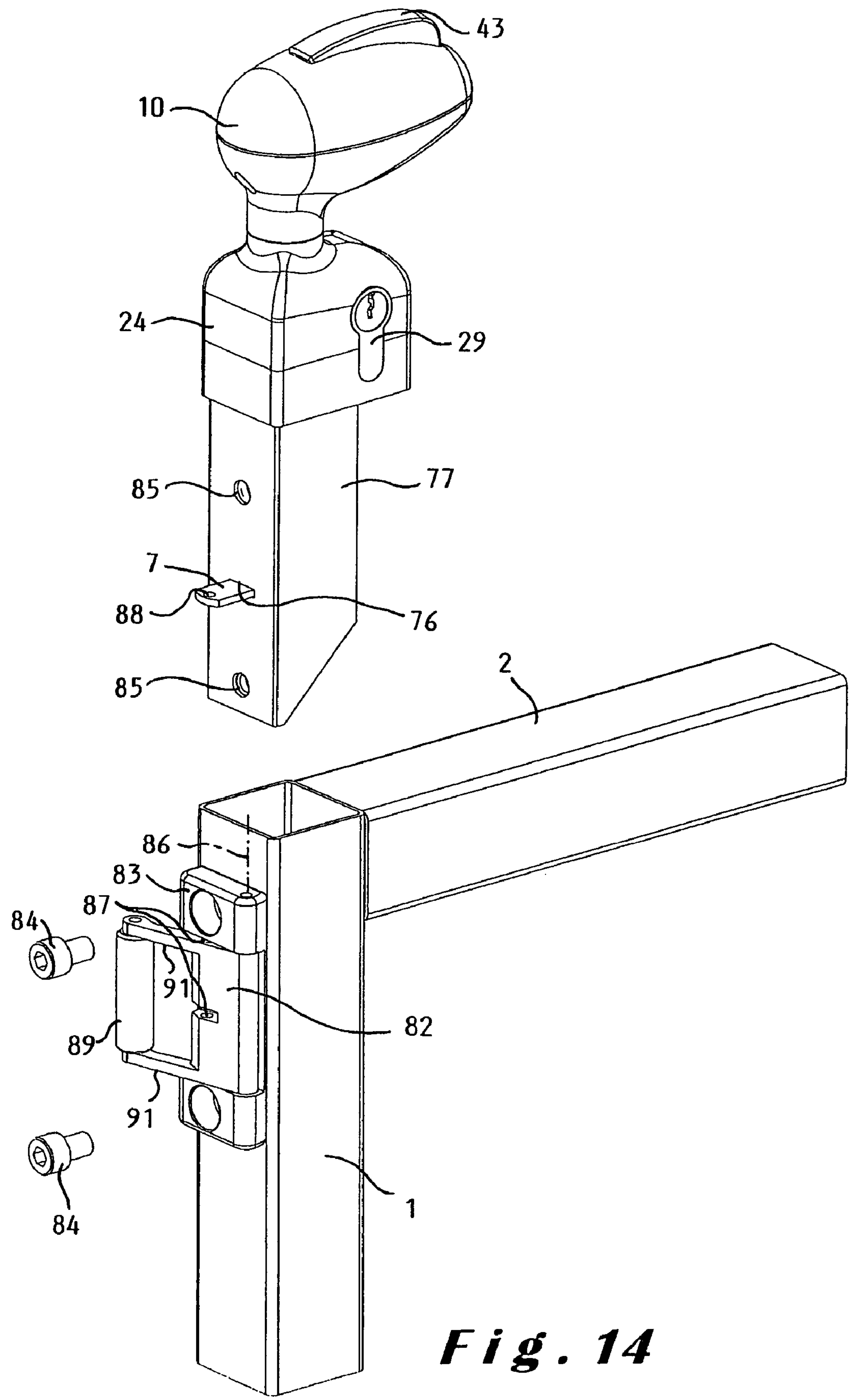
FIG. 14 shows the same view as FIG. 13 but with the self-latching device in a position wherein it is still to be mounted in a vertical tubular member of the gate.
Figure 15:
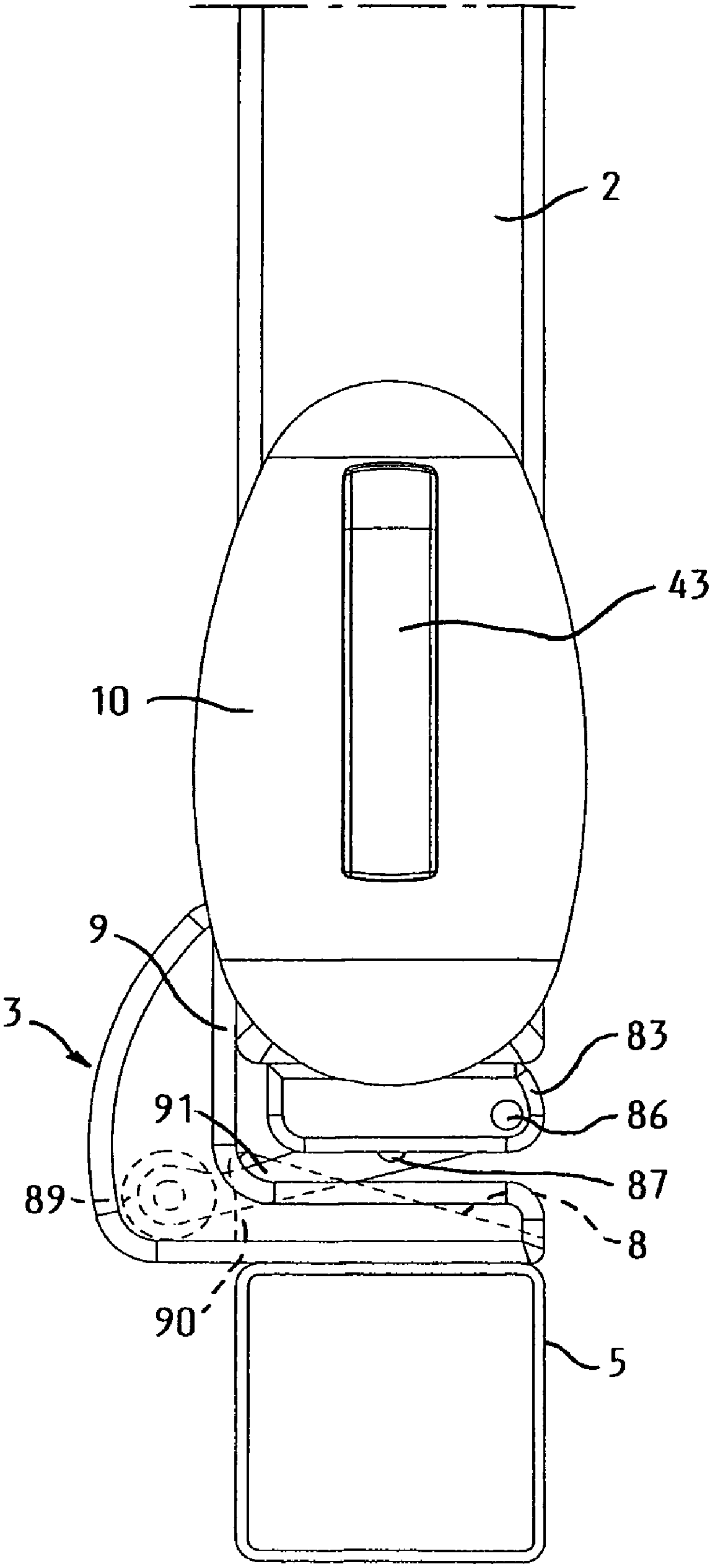
FIG. 15 shows a top plan view on the latching device illustrated in FIG. 13 and of the striker element co-operating therewith to latch the gate.

In the embodiment illustrated in FIGS. 13 to 17, the stroke of the latch bolt 7 is equal to the stroke of the cam elements 61, 62. In order to increase the stroke of latching device, the latch bolt is arranged to co-operate with the striker element 3 through the intermediary of a hinged latch 82 mounted on the outer side of the gate 2. The hinged latch 82 is more particularly hingedly connected to a base part 83 which can be fixed by means of two screws 84 to a lateral side of the gate 2. In the tubular frame component 77 two threaded holes 85 are provided wherein the screws 84 can be applied after having inserted the latching device, as illustrated in FIG. 14, in the vertical tubular member 1. In this way, the hinged latch 82 and the latching device are fixed at the same time to the gate 2.

The hinged latch 82 has a free distal extremity which is arranged to be caught in the closed position of the gate 2 behind the striker element 3 whilst the proximal extremity is hingedly connected around a hinge axis 86 to the base part 83. The hinge axis 86 is preferably substantially parallel to the hinge axis of the hinged closure member or gate 2. An important feature of this embodiment is that the distal end of the latch bolt 7 is connected to the hinged latch 82 between the proximal and the distal extremity thereof. This connection is made by means of a pin applied in a boring 87 in the hinged latch 82 through a hole 88 in the distal end of the latch bolt 7. By moving the latch bolt 7 between its latching and retracted positions, the hinged latch 82 is thus pivoted about its hinge axis 86. Due to the lever effect, the stroke of the distal extremity is greater than the stroke of the latch bolt 7.

The distal extremity of the hinged latch 82 comprises a roll 89 which is rotatably mounted on an axis 90 so that it rolls over the inclined surface 8 formed by a ridge 90 on the striker element 3 until it snaps behind the ridge 90. The roll 89 is mounted between two arms 92 which extend on both sides of the ridge 90 when the roll 89 is caught behind the ridge 90 of the hinged latch 82 (see FIG. 15). The ridge has a width which is smaller than the distance between the two arms 91 so that even when the gate sags somewhat, a reliable functioning of the latching device is assured. The arms 91 have preferably such a length that the roll 89 extends beyond the frame of the latching device. In this way, a smaller gap is required between the gate 2 and the striker element 3.

As explained hereabove, the stroke of the latching device is increased in the embodiment illustrated in FIGS. 13 to 17 by means of the hinged latch on the outside of the gate. It is clear that such a hinged latch can also be provided in the embodiment illustrated in FIGS. 1 to 12 so that a still larger stroke is obtained.

FIGS. 18 to 21 illustrate a variant embodiment of the additional safety mechanism provided on the operator knob. This safety mechanism comprises also an additional operator element, more particularly a push element 43, which has to be operated simultaneously with the operator knob 10 in order to enable to unlatch the gate 2. In contrast to the previous embodiment, this safety mechanism does not comprise locking means which lock the operator knob 10 with respect to the frame of the latching device but it comprises coupling means 92 arranged between the operator knob 10 and the operator shaft 48. These coupling means 92 are movable by means of the push element 43 between a position wherein the operator knob 10 is connected to the operator shaft 48 and a position wherein the operator knob 10 is disconnected from the operator shaft 48. The safety mechanism further comprises biasing means, in particular a same compression spring 44 as in the previous embodiment, for biasing the coupling means 92 into the position wherein the operator knob 10 is disconnected from the operator shaft 48. Consequently, the additional operator element 43 has also to be actuated in this embodiment simultaneously with the operator knob 10 to enable to unlatch the gate 2.

The coupling means 92 comprise a lever which can pivot about a thickened extremity 93 with respect to the operator knob 10. In contrast to the previous embodiment, the plate 49 fixed to the upper extremity of the operator shaft 48 can now rotate in the operator knob 10. The coupling means 92 comprise a projection 94 on the bottom of the lever which engages a notch 95 in the plate 49 when depressing the push element 43 against the action of the compression spring 44. In this way the operator knob 10 is connected to the operator shaft 48. When releasing the push element, the lever is raised by the compression spring 44 so that the projection 94 is removed from the notch 95 in the plate 49. In this position, the operator knob 10 is disconnected from the operator shaft 48 and can thus be rotated without rotating the operator shaft 48.

To return the operator knob 10 automatically to its rest position wherein the push element 43 can be depressed to engage the projection 94 in the notch 95 a torsion spring 96 is applied in the operator knob 10 around the operator shaft 48. The torsion spring 96 is received in a cylindrical hole 97 provided in the top surface of the fifth frame 31 around the operator shaft 48. In the wall of the cylindrical hole 97, a free space 101 is provided for the laterally projecting ends 98 of the torsion spring 98. This free space 101 extends over about 90° and enables to pre-stress the torsion spring in the cylindrical hole 97 and to rotate each of the free ends 98 towards the other. In the operator knob 10 a plate 99 is irrotatably fixed having a cylindrical opening for the operator shaft 48 and around this opening a downward ridge 100 extending over about 270° around the operator shaft 48. The downward ridge 100 fits around the torsion spring in the cylindrical hole 97 so that the free ends of the ridge engage the free ends of the torsion spring 96. When rotating the operator knob 10 in either direction, the torsion spring 96 is stressed by the ridge 100 on the plate 99 so that when releasing the operator knob 10 again, the knob 10 returns to its rest position. An important advantage of this embodiment is that the strength of the compression spring 44 can be freely selected in function of the force which has to be applied onto the push element without hampering the return of the operator knob 10 to its rest position. The stronger the compression spring 44, the more difficult it will be for children to depress the push element 43.

From the above given description of some preferred embodiments of the self-latching device according to the present invention, it will be clear that many modifications can be applied thereto without departing from the scope of the appended claims.

In particular it is clear that a mechanism with a torsion spring 96 can also be applied in the first embodiment to provide an additional bias for returning the operator means to their rest position.

What is claimed is:

1. A self-latching device for fastening a hinged closure member, which device comprises:

- a frame arranged to be mounted on the hinged closure member;
- a latch bolt mounted on said frame so as to be movable in a predetermined direction between a latching position and a retracted position, the latch bolt being arranged to be moved towards its retracted position by contact with a striker element when closing the closure member and the predetermined direction wherein the latch bolt is movable being a substantially horizontal direction when the latching device is mounted in an upright position on the closure member;
- a latch bolt spring arranged to bias the latch bolt into the latching position; and
- operator means mounted on top of the frame so as to be operable from both sides of the closure member and connected by means of a latch bolt operating mechanism to the latch bolt for moving the latch bolt from the latching to the retracted position, the latch bolt operating mechanism comprising:
- an operator shaft which has a longitudinal axis, which is pivotally mounted around said longitudinal axis on said frame and which has an upper and a lower end, the operator means being connected to the upper end of the operator shaft to enable to rotate the operator shaft by means of the operator means; and
- at least one cam element provided on the lower end of the operator shaft and arranged to move the latch bolt against the biasing force of the latch bolt spring to its retracted position upon rotation of the operator shaft in at least one rotational direction.

2. A self-latching device for fastening a hinged closure member, which device comprises:

- a frame arranged to be mounted on the hinged closure member;
- a latch bolt mounted on said frame so as to be movable in a predetermined direction between a latching position and a retracted position, the latch bolt being arranged to be moved towards its retracted position by contact with a striker element when closing the closure member and the predetermined direction wherein the latch bolt is movable being a substantially horizontal direction when the latching device is mounted in an upright position on the closure member;

a latch bolt spring arranged to bias the latch bolt into the latching position; and operator means mounted on top of the frame so as to be operable from both sides of the closure member and connected by means of a latch bolt operating mechanism to the latch bolt for moving the latch bolt from the latching to the retracted position, wherein when the latch bolt is in its latching position, the latch bolt operating mechanism is in a rest position and the latch bolt is mounted on the frame to be movable against the biasing force of the latch bolt spring to its retracted position whilst the latch bolt operating mechanism remains in its rest position.

3. The latching device as claimed in claim 2, wherein the latch bolt operating mechanism comprises a further spring for urging the latch bolt operating mechanism, independently from the latch bolt, to its rest position.

4. A self-latching device for fastening a hinged closure member, which device comprises:

a frame arranged to be mounted on the hinged closure member;

a latch bolt mounted on said frame so as to be movable in a predetermined direction between a latching position and a retracted position, the latch bolt being arranged to be moved towards its retracted position by contact with a striker element when closing the closure member and the predetermined direction wherein the latch bolt is movable being a substantially horizontal direction when the latching device is mounted in an upright position on the closure member;

a latch bolt spring arranged to bias the latch bolt into the latching position and having such a spring constant that a force smaller than 30 N has to be exerted onto the latch bolt to move the latch bolt from its latching to its retracted position; and operator means mounted on top of the frame so as to be operable from both sides of the closure member and connected by means of a latch bolt operating mechanism to the latch bolt for moving the latch bolt from the latching to the retracted position.

5. The latching device as claimed in claim 1, wherein the latch bolt operating mechanism comprises a follower element which is movably mounted on the frame according to a direction having at least a component coinciding with the predetermined direction wherein the latch bolt moves, the follower element being either provided on the latch bolt or the latch bolt is biased by the latch bolt spring against the follower element, the follower element having a surface engaged by said cam element to be moved in said direction against the biasing force of the latch bolt spring upon rotation of the operator shaft in said rotational direction.

6. The latching device as claimed in claim 1, wherein the latch bolt operating mechanism comprises a further cam element provided on the lower end of the operator shaft and arranged to move the latch bolt against the biasing force of the latch bolt spring to its retracted position upon rotation of the operator shaft in a further rotational direction, opposite said rotational direction.

7. The latching device as claimed in claim 5, wherein the latch bolt is biased by the latch bolt spring against the follower element.

8. The latching device as claimed in claim 7, wherein the latch bolt operating mechanism comprises a further spring for urging the latch bolt operating mechanism, independently from the latch bolt, to its rest position, said further spring being provided between the frame and the follower element to provide, in addition to the biasing force of the latch bolt spring, a further biasing force onto the follower element.

9. The latching device as claimed in claim 7, wherein the follower element is hingedly connected to the frame about a hinge axis which is located at a predetermined distance from the location where the latch bolt is biased by the latch bolt spring against the follower element and which is preferably substantially perpendicular to said predetermined direction.

10. The latching device as claimed in claim 9, wherein the surface of the follower element engaged by said cam element is located at a distance smaller than said predetermined distance from the hinge axis of the follower element.

11. The latching device as claimed in claim 5, wherein the follower element is provided on the latch bolt, and wherein the latch bolt operating mechanism comprises a further follower element which has a further surface which is engaged by a cam element on the operator shaft so as to be moved thereby upon rotation of the operator shaft and which is urged under the force of a further spring against said cam element, the follower element being arranged to move independently from the further follower element when the latch bolt is pushed in when closing the closure member.

12. The latching device as claimed in claim 1, comprising further:

an additional operator element, in particular a push element, on the operator means;

locking means movable by means of the additional operator element between a locked position, wherein the operator means are locked with respect to the frame of the latching device, and an unlocked position, wherein the operator means can be rotated with respect to said frame; and biasing means for biasing the locking means into the locked position so that the additional operator element has to be actuated simultaneously with the operator means in order to enable to rotate the operator shaft by means of the operator means.

13. The latching device as claimed in claim 1, comprising further:

an additional operator element, in particular a push element, on the operator means;

coupling means movable by means of the additional operator element between a connected position wherein the operator means are connected to the operator shaft and a disconnected position wherein the operator means are disconnected from the operator shaft; and biasing means for biasing the coupling means into the disconnected position so that the additional operator element has to be actuated simultaneously with the operator means in order to enable to rotate the operator shaft by means of the operator means.

14. The latching device as claimed in claim 1, comprising further a key operated locking mechanism for locking the operator shaft with respect to the frame.

15. A self-latching device for fastening a hinged closure member, which device comprises:

a frame arranged to be mounted on the hinged closure member;

a latch bolt mounted on said frame so as to be movable in a predetermined direction between a latching position and a retracted position, the latch bolt being arranged to be moved towards its retracted position by contact with a striker element when closing the closure member and the predetermined direction wherein the latch bolt is movable being a substantially horizontal direction when the latching device is mounted in an upright position on the closure member;

a latch bolt spring arranged to bias the latch bolt into the latching position; and operator means mounted on top of the frame so as to be operable from both sides of the closure member and connected by means of a latch bolt operating mechanism to the latch bolt for moving the latch bolt from the latching to the retracted position, the latch bolt operating mechanism comprising a follower element which is movably mounted on the frame according to a direction having at least a component coinciding with the predetermined direction wherein the latch bolt moves, the latch bolt being biased by the latch bolt spring against the follower element and the follower element being hingedly connected to the frame about a hinge axis which is located at a predetermined distance from the location where the latch bolt is biased by the latch bolt spring against the follower element, a force exerted onto the operator means to unlock the latching device being transmitted to the follower element at a location on the follower element situated at a distance smaller than said predetermined distance from the hinge axis of the follower element to move the follower element in said direction against the biasing force of the latch bolt spring.

16. A self-latching device for fastening a hinged closure member, which device comprises:

a frame arranged to be mounted on the hinged closure member;

a latch bolt mounted on said frame so as to be movable in a predetermined direction between a latching position and a retracted position, the latch bolt being arranged to be moved towards its retracted position by contact with a striker element when closing the closure member and the predetermined direction wherein the latch bolt is movable being a substantially horizontal direction when the latching device is mounted in an upright position on the closure member;

a latch bolt spring arranged to bias the latch bolt into the latching position; and operator means mounted on top of the frame so as to be operable from both sides of the closure member and connected by means of a latch bolt operating mechanism to the latch bolt for moving the latch bolt from the latching to the retracted position, wherein the frame is arranged to be mounted in a substantially vertical tubular member of the closure member or arranged to be fixed against the closure member and provided with a lateral opening for the latch bolt, the latching device comprising a bushing with a shoulder and a screw threaded portion, the bushing being arranged to be applied over the latch bolt and to be screwed with the screw threaded portion into the frame so that the shoulder engages the tubular member and the latching device is fixed to the tubular member, the bushing being further arranged to guide the latch bolt.

17. A self-latching device for fastening a hinged closure member, which device comprises:

a frame arranged to be mounted on the hinged closure member;

a latch bolt mounted on said frame so as to be movable in a predetermined direction between a latching position and a retracted position, the latch bolt being arranged to be moved towards its retracted position by contact with a striker element when closing the closure member and the predetermined direction wherein the latch bolt is movable being a substantially horizontal direction when the latching device is mounted in an upright position on the closure member, the latch bolt having a distal extremity formed by a roll arranged to roll over an inclined surface of said striker element to push the latch bolt in when closing the closure member;

a latch bolt spring arranged to bias the latch bolt into the latching position; and operator means mounted on top of the frame so as to be operable from both sides of the closure member and connected by means of a latch bolt operating mechanism to the latch bolt for moving the latch bolt from the latching to the retracted position.

18. A self latching device for fastening a hinged closure member, which device comprises:

a frame arranged to be mounted on the hinged closure member;

a latch bolt mounted on said frame so as to be movable in a predetermined direction between a latching position and a retracted position, the latch bolt being arranged to be moved towards its retracted position by contact with a striker element when closing the closure member and the predetermined direction wherein the latch bolt is movable being a substantially horizontal direction when the latching device is mounted in an upright position on the closure member;

a latch bolt spring arranged to bias the latch bolt into the latching position;

operator means mounted on top of the frame so as to be operable from both sides of the closure member and connected by means of a latch bolt operating mechanism to the latch bolt for moving the latch bolt from the latching to the retracted position; and a striker element;

a hinged latch having a first end, which is arranged to be caught in the closed position of the closure member behind said striker element, and a second end, which is arranged to be hingedly connected around a hinge axis to the closure member; and means for connecting the distal end of the latch bolt to the hinged latch, between the first and the second end thereof.

19. The latching device as claimed in claim 18, wherein the striker element has an inclined surface arranged to co-operate with the first end of the hinged latch to rotate the hinged latch about said hinge axis and to push the latch bolt into the frame of the latching device when closing the closure member.

20. The latching device as claimed in claim 19, wherein the first end of the hinged latch comprises a roll which is rotatably mounted on an axis and which is arranged to roll over the inclined surface of the striker element when closing the closure member.

21. The latching device as claimed in claim 20, wherein the hinged latch has such a length, measured between the first and the second ends thereof, that the roll extends beyond the frame of the latching device.

22. The latching device as claimed in claim 4, wherein the spring constant of the latch bolt spring is such that a force smaller than 20 N has to be exerted onto the latch bolt to move the latch bolt from its latching to its retracted position.

* * * * *